United States Patent
Singh Dilip Thakur et al.

(10) Patent No.: US 11,704,303 B2
(45) Date of Patent: Jul. 18, 2023

(54) METHOD AND SYSTEM FOR PROCESSING TRANSACTIONS IN A BLOCKCHAIN NETWORK

(71) Applicant: Tata Consultancy Services Limited, Mumbai (IN)

(72) Inventors: Meena Singh Dilip Thakur, Bangalore (IN); Lakshmi Padmaja Maddali, Hyderabad (IN); Vigneswaran Ramachandran, Chennai (IN); Rajan Mindigal Alasingara Bhattachar, Bangalore (IN); Srujana Kanchanapalli, Bangalore (IN); Batsayan Das, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 336 days.

(21) Appl. No.: 17/127,052

(22) Filed: Dec. 18, 2020

(65) Prior Publication Data
US 2021/0232571 A1    Jul. 29, 2021

(30) Foreign Application Priority Data
Jan. 6, 2020  (IN) .............................. 202021000567

(51) Int. Cl.
  *G06F 16/00*   (2019.01)
  *G06F 16/23*   (2019.01)
(52) U.S. Cl.
  CPC ...... *G06F 16/2379* (2019.01); *G06F 16/2365* (2019.01)

(58) Field of Classification Search
  CPC .. G06F 16/2379; G06F 16/2365; G06F 21/53; G06F 21/57; G06F 21/64; H04L 63/126
  See application file for complete search history.

(56) References Cited

U.S. PATENT DOCUMENTS

2019/0279206 A1*  9/2019  Song ............... G06F 16/1805
2019/0384627 A1* 12/2019  De Caro ............ G06Q 20/223
(Continued)

OTHER PUBLICATIONS

Mazumdar, Subhra et al., "Design of Anonymous Endorsement System in Hyperledger Fabric", Computer Science, 2019, Arxiv.org, http://library.isical.ac.in:8080/jspui/bitstream/123456789/6956/1/Diss-390.pdf.
(Continued)

*Primary Examiner* — Dinku W Gebresenbet
(74) *Attorney, Agent, or Firm* — Finnegan, Henderson, Farabow, Garrett & Dunner LLP

(57) ABSTRACT

Transaction executions/commits in a blockchain network need to be fast, robust and secure and thus calls for minimal latency in transaction commits. In an execute-order-commit blockchain network, latency is high due to smart contracts been executed at every endorsing node of the blockchain network. A method and system for processing transactions in the blockchain network is disclosed. The system discloses a veriblock architecture, which enables processing a transaction request by executing an associated smart contract along with a proof of correctness of execution of smart contract using only one endorser. Further, enables verifying the smart contract by multiple endorsers. The smart contract associated with the proof, referred herein as a vericontract, is executed to generate an output and the proof using one of a) Verifiable Computing (VC) approach, b) a TEE approach and c) a hybrid approach (combination of VC and TEE).

13 Claims, 25 Drawing Sheets

(56) References Cited

U.S. PATENT DOCUMENTS

2020/0090188 A1* 3/2020 Wince .................... H04L 9/50
2021/0314143 A1* 10/2021 Conner ............... H04L 63/067

OTHER PUBLICATIONS

Kerber, Thomas, "Verifiable Computation in Smart Contracts", Computer Science, 2017, Semantic Scholar, Link: https://project-archive.inf.ed.ac.uk/ug4/20170882/ug4_proj.pdf.

Xiao, Yang et al., "Enforcing Private Data Usage Control with Blockchain and Attested Off-chain Contract Execution", Cryptography and Security, 2020, Arxiv.org, https://arxiv.org/pdf/1904.07275.pdf.

* cited by examiner

METHOD AND SYSTEM FOR PROCESSING TRANSACTIONS IN A BLOCKCHAIN NETWORK

PRIORITY CLAIM

This U.S. patent application claims priority under 35 U.S.C. § 119 to: India Application No. 202021000567, filed on Jan. 6, 2020. The entire contents of the aforementioned application are incorporated herein by reference.

TECHNICAL FIELD

The embodiments herein generally relate to the field of blockchain networks and, more particularly, to method and system for processing transactions in a blockchain network.

BACKGROUND

Enterprise blockchain, specifically the permissioned blockchain, is emerging as a key enabling platform to design and deploy various distributed applications (in the area of smart city, smart banking, smart retail, etc.). These applications in turn process large number of digital transactions related to lot of customers in their day to day activities. Hence in order to enable good Quality of Service (QoS) for the customers, these transactions executions/commits need to be fast, robust and secure and thus calls for minimal latency in transaction commits. One of the main open issues in the blockchain is scalability with respect to transaction throughput. It depends on block size (number of transactions in a block), number of nodes (replicas) in the network, type of consensus algorithm used (For example, Byzantine Fault tolerant (BFT) generally need n=3t+1 replicas, where t is the number of byzantine nodes) in the network, complexity of the smart contract (a transaction is realized using a smart contract), etc. It is observed that with number of nodes is less than 20, transaction throughput per second (tps) is of the order of 10000. Higher the number of replicas, lower will be the transaction throughput.

Several research papers are devoted to address the scalability of the blockchain through efficient frameworks, consensus algorithms, cryptographic techniques, etc. For instance, traditional blockchain framework is designed based on order-execute model. Here transactions from several replicas are grouped into a block in a particular sequence (ordering) through BFT consensus and then all the transactions of the block are executed in an order and consensus among the nodes to validate the consistency of the after effect of the transaction execution and finally the block commit to the blockchain. However, it is to be noted that transaction throughput slows down as the number of nodes increases due to complexity of the consensus execution due to messaging complexity and computation overhead (as every replica needs to execute the same transaction followed by the consensus and number of replicas needs to be 3t+1). To improve the performance of blockchain, design of efficient consensus algorithms, gossip protocols, sharding techniques are proposed in literature. Further to speed up the BFT consensus, the algorithm is realized using hardware. However parallel executions of independent transactions are still not possible in this existing approach.

To overcome this, an execute-order-validate model for a blockchain framework work has been developed and used. Here set of nodes endorses the transactions through transaction simulations and subsequently generates read-write set. Then, these endorsed transactions are ordered through consensus and subsequently committed based on validity of the endorsements (based on number of endorsements and consistency in the endorsements). Thus, in the execute-order-validate model, transactions can be endorsed in parallel, which improves the transaction throughput. Further consistency of the commitments is validated/managed through gossiping among the committing replicas. However, still endorsements need to be replicated many times and thus affects the transaction throughput.

SUMMARY

Embodiments of the present disclosure present technological improvements as solutions to one or more of the above-mentioned technical problems recognized by the inventors in conventional systems. For example, in one embodiment, a method for processing transactions in a blockchain network is provided. The method receives via a client among plurality of clients in a blockchain network, a request for processing a transaction from an end user. Further, the method generates via the client, a first set of transaction proposals for the transaction. Further, the method forwards via the client, the first set of transaction proposals to one or more proving peers, identified among a plurality of endorsing peers in the blockchain network in accordance with an endorsement policy.

Furthermore, the method executes via each of the one or more proving peers, a vericontract corresponding to the first set of transaction proposals, wherein the vericontract is a smart contract associated with a proof of correctness of execution of the smart contract by each of the one or more proving peers during an endorsement phase of a blockchain process, and wherein the vericontract is executed to generate an output and the proof using one of a) Verifiable Computing (VC) approach, b) a Trusted Execution Environment (TEE) approach and c) a hybrid approach comprising combination of the VC approach and the TEE approach.

Furthermore, the method sends a first set of proposal responses to the client, wherein the first set of proposal responses are generated in terms of a set of verification data, by the one or more hardware processors via each of the one or more proving peers to the client, wherein each verification data among the set of verification data comprises the output accompanied with the proof generated during execution of the vericontract by each of the one or more proving peers.

Thereafter, the method processes via the client, the first set of proposal responses for executing the transaction in the blockchain network based on one of a) an endorser-verify model and b) a committer-verify model, wherein the one or more hardware processors are configured to process the first set of transaction proposal responses in accordance with the endorser-verify model by: creating and sharing by the client, a second set of transaction proposals to a set of verifying peers, wherein the second set of transaction proposals are generated for the received first set of proposal responses and comprises the set of verification data, and wherein the set of verifying peers are a set of endorsing verifiers identified among the plurality of endorsing peers in accordance with the endorsement policy for the endorser-verify model; processing the second set of transaction proposals, by the set of endorsing verifiers to verify the executed vericontract based on the set of verification data received in the second set of transaction proposals during the endorsement phase, wherein the verification is performed in accordance with a) the VC approach, b) the TEE approach and c) the hybrid approach used during execution of the vericontract; sending a second set of proposal responses generated by each of the set of endorsing verifiers, indicating endorsed transactions to the client in response to the processed second set of transaction proposals; broadcasting by the client to an orderer the endorsed transactions; ordering by the orderer, the endorsed transactions into a block and broadcasting the block to a plurality of committing peers of the blockchain network, wherein the plurality of committing peers comprise participating peers in the blockchain network; and committing the transaction to the blockchain network by the plurality of committing peers after verifying the endorsed transactions and validating results of the endorsed transactions.

In another aspect, a system, alternatively referred as a blockchain network, for processing transactions in a blockchain is provided. The system comprises a memory storing instructions; one or more Input/Output (I/O) interfaces; and one or more hardware processors coupled to the memory via the one or more I/O interfaces, wherein the one or more hardware processors are configured by the instructions to receive via a client among plurality of clients in a blockchain network, a request for processing a transaction from an end user; generate via the client, a first set of transaction proposals for the transaction; forward via the client, the first set of transaction proposals to one or more proving peers, identified among a plurality of endorsing peers in the blockchain network in accordance with an endorsement policy; execute via each of the one or more proving peers, a vericontract corresponding to the first set of transaction proposals, wherein the vericontract is a smart contract associated with a proof of correctness of execution of the smart contract by each of the one or more proving peers during an endorsement phase of a blockchain process, and wherein the vericontract is executed to generate an output and the proof using one of a) Verifiable Computing (VC) approach, b) a Trusted Execution Environment (TEE) approach and c) a hybrid approach comprising combination of the VC approach and the TEE approach. Further, the system is configured to send a first set of proposal responses to the client, wherein the first set of proposal responses are generated in terms of a set of verification data, by the one or more hardware processors via each of the one or more proving peers to the client, wherein each verification data among the set of verification data comprises the output accompanied with the proof generated during execution of the vericontract by each of the one or more proving peers; and process via the client, the first set of proposal responses for executing the transaction in the blockchain network based on one of a) an endorser-verify model and b) a committer-verify model. The one or more hardware processors are configured to process the first set of transaction proposal responses in accordance with the endorser-verify model by: creating and sharing by the client, a second set of transaction proposals to a set of verifying peers, wherein the second set of transaction proposals are generated for the received first set of proposal responses and comprises the set of verification data, and wherein the set of verifying peers are a set of endorsing verifiers identified among the plurality of endorsing peers in accordance with the endorsement policy for the endorser-verify model; processing the second set of transaction proposals, by the set of endorsing verifiers to verify the executed vericontract based on the set of verification data received in the second set of transaction proposals during the endorsement phase, wherein the verification is performed in accordance with a) the VC approach, b) the TEE approach and c) the hybrid approach used during execution of the vericontract; sending a second set of proposal responses generated by each of the set of endorsing verifiers, indicating endorsed transactions to the client in response to the processed second set of transaction proposals; broadcasting by the client to an orderer the endorsed transactions; ordering by the orderer, the endorsed transactions into a block and broadcasting the block to a plurality of committing peers of the blockchain network, wherein the plurality of committing peers comprise participating peers in the blockchain network; and committing the transaction to the blockchain network by the plurality of committing peers after verifying the endorsed transactions and validating results of the endorsed transactions.

In yet another aspect, there are provided one or more non-transitory machine readable information storage mediums comprising one or more instructions, which when executed by one or more hardware processors causes a method for processing transactions in a blockchain network. The method receives via a client among plurality of clients in a blockchain network, a request for processing a transaction from an end user.

Further, the method generates via the client, a first set of transaction proposals for the transaction. Further, the method forwards via the client, the first set of transaction proposals to one or more proving peers, identified among a plurality of endorsing peers in the blockchain network in accordance with an endorsement policy.

Furthermore, the method executes via each of the one or more proving peers, a vericontract corresponding to the first set of transaction proposals, wherein the vericontract is a smart contract associated with a proof of correctness of execution of the smart contract by each of the one or more proving peers during an endorsement phase of a blockchain process, and wherein the vericontract is executed to generate an output and the proof using one of a) Verifiable Computing (VC) approach, b) a Trusted Execution Environment (TEE) approach and c) a hybrid approach comprising combination of the VC approach and the TEE approach.

Furthermore, the method sends a first set of proposal responses to the client, wherein the first set of proposal responses are generated in terms of a set of verification data, by the one or more hardware processors via each of the one or more proving peers to the client, wherein each verification data among the set of verification data comprises the output accompanied with the proof generated during execution of the vericontract by each of the one or more proving peers.

Thereafter, the method processes via the client, the first set of proposal responses for executing the transaction in the blockchain network based on one of a) an endorser-verify model and b) a committer-verify model, wherein the one or more hardware processors are configured to process the first set of transaction proposal responses in accordance with the endorser-verify model by: creating and sharing by the client, a second set of transaction proposals to a set of verifying peers, wherein the second set of transaction proposals are generated for the received first set of proposal responses and comprises the set of verification data, and wherein the set of verifying peers are a set of endorsing verifiers identified among the plurality of endorsing peers in accordance with the endorsement policy for the endorser-verify model; processing the second set of transaction proposals, by the set of endorsing verifiers to verify the executed vericontract based on the set of verification data received in the second set of transaction proposals during the endorsement phase, wherein the verification is performed in accordance with a) the VC approach, b) the TEE approach and c) the hybrid approach used during execution of the vericontract; sending a second set of proposal responses generated by each of the set of endorsing verifiers, indicating endorsed transactions to the client in response to the processed second set of transaction proposals; broadcasting by the client to an orderer the endorsed transactions; ordering by the orderer, the endorsed transactions into a block and broadcasting the block to a plurality of committing peers of the blockchain network, wherein the plurality of committing peers comprise participating peers in the blockchain network; and committing the transaction to the blockchain network by the plurality of committing peers after verifying the endorsed transactions and validating results of the endorsed transactions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1A:
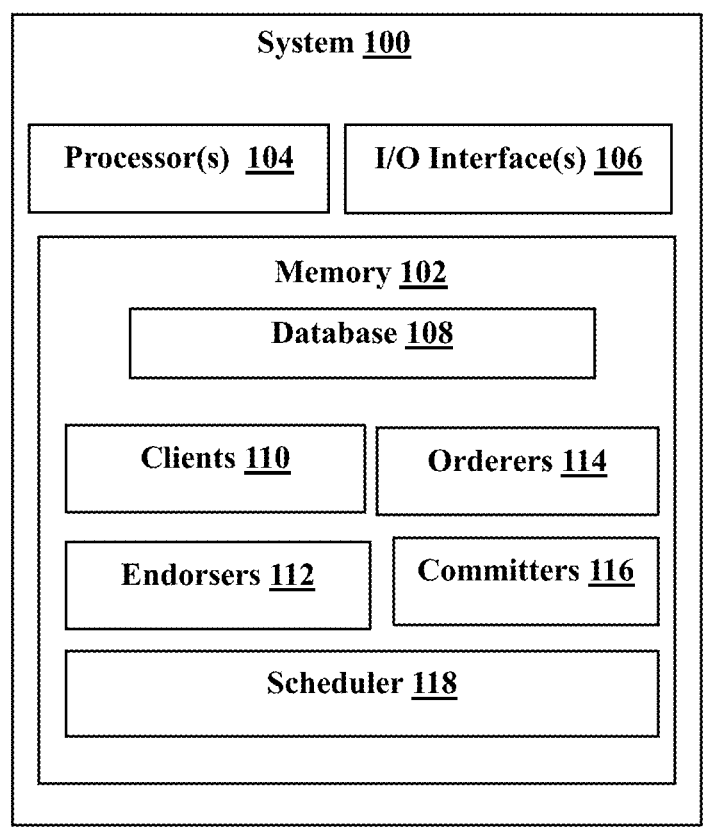
FIG. 1A is a functional block diagram of a system, interchangeably referred as a blockchain network, for processing transactions in the blockchain network, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

As stated above, endorsements need to be replicated many times and thus affects the transaction throughput. To address this issue, there are mainly two approaches used in literature. (i) Cryptographic techniques (ii) Trusted Execution Environment (TEE). In cryptographic approach, using the concept of Verifiable Computing (VC), a transaction is executed at a dedicated node (proof generating endorsing node), wherein a proof of correctness of execution of the smart contract associated with the transaction (which can be used to check the integrity of the execution) is also provided. The proof of correctness of execution is interchangeably referred as proof throughout the description. Then the other endorsing nodes, need to only verify the proof and thus can improve the transaction throughput. There are several VC frameworks, designed based on Succinct Non-interactive ARguments of Knowledge (SNARKs), Scalable Transparent Arguments of Knowledge (STARKs), Zero Knowledge Proof (ZKP) and Multi-party Computation (MPC). However, in these VC based approaches complexity of the proof generation and verification is still high.

Further to enable the privacy of the transaction execution, techniques such as functional encryption, Fully Homomorphic Encryption (FHE) and ZKP protocols can be envisaged. In case of FHE, transaction execution happens on encrypted inputs. Using ZKP, instead of exposing the actual input values, a mathematical proof can be provided which indicates whether input possess the intended attribute or not. For example, set membership, range queries can be computed based on ZKP without revealing actual input data. However, in general, the ZKP approaches are computationally intensive and in order to envisage privacy preserving transactions, these implementations are done in a VC framework. Thus, it further increases the complexity of the proof generation and verification.

Other technique based on VC, to improve the scalability of blockchain, is off-chaining. Using off-chain, the load on the blockchain (both in terms of computation and storage) are offloaded to the external resources, thereby reducing the redundant executions at different replicas are minimized. To ensure integrity of the computation and storage, VC and ZKP techniques are used. One of the main advantage of these paradigms for blockchain is the existence of strong mathematical proof on security guarantees of these schemes' despite of the computational overhead. An existing literature proposes theoretical frameworks based on these paradigms for blockchain. However, there is a need for benchmarking the performance of these approaches for blockchain applications.

Improving the performance of blockchain based on Trusted Execution Environment (TEE) is increasingly been discussed in many literature works. A COCO architecture (renamed to CCF: confidential consortium framework) based on Intel SGX™ (a verifiable computing environment) for blockchain is one such recent approach, however, is more suitable for order-execute framework. Here consortium of nodes uses Intel SGX™, alternatively referred as SGX, as TEE and transactions are executed inside the trusted SGX enclave. Subsequently through consensus, transactions are committed to blockchain. Note that transactions operate on blockchain state, which is also managed inside the SGX enclave. One of the main advantages of using the SGX for blockchain is to enable transaction and smart contract privacy which is achieved through encryptions and sealing operations. In one of the existing works, protocols are designed for inter SGX communication and for consensus protocol in SGX environment. Several threat scenarios such as replay/rollback attacks are discussed along with mitigations.

In another existing method, a design of blockchain based on SGX for Hyperledger Fabric which is based on execute-order-validate framework is proposed. Also, discussed is difficulty of using COCO framework for this kind of blockchain framework. In this scheme, there are trusted enclaves for each chaincode execution, orderer and ledger framework. The peers (endorsers/committers) and ledger are managed in untrusted environment. The chaincode enclave is responsible for executing the transaction by checking the integrity of the blockchain state through ledger enclave (which maintains the recent blockchain state) and the result of the transaction by chaincode enclave is validated by the peers before committing it into blockchain. In performance analysis of this work (based on COCO framework), it is shown that there is only 10% to 20% performance overhead for bidding use case (for enabling confidentiality of transaction execution). Further in this scheme, state continuity and rollback attacks are discussed, and mitigations are also proposed.

However, from the existing works discussed above, pros and cons of different approaches for improving the scalability of the blockchain for both order-execute and execute-order-validate frameworks based on cryptographic and TEE approaches are discussed. Further, it can be inferred that most of the studies based on these approaches are theoretical in nature and practical aspects in terms of deployment and performance analysis based on experimentations are discussed to some extent only. Moreover, these studies are done separately for VC and TEE and comparisons through experiments between these two approaches are not discussed in depth. Though TEE based approach (for example, using Intel SGX) has edge over VC with respect to performance, however there are security concerns (recent Spectre and Meltdown attacks on SGX). Further another critical issue with the SGX is that there is no underlying mathematical guarantees on security. The advantage with VC is that, it provides strong mathematical guarantees for the security, but it is very slow. Hence, each approach has certain advantages and disadvantages, one needs careful analysis before deploying them for large scale commercial implementations. Further, based on desired security level, latency, cost, etc. using them rightly as a VC-TEE combinational approach for executing the smart contract is desirable.

Embodiments herein provide a method and system for processing transactions in the blockchain network. The system discloses an architecture, referred as veriblock architecture, providing a new approach to process the transaction in an execute-order-validate type blockchain network. In description herein, the execute-order-validate block chain network is interchangeably referred as execute-order-commit. The veriblock architecture enables processing a transaction request by executing an associated smart contract along with a proof of correctness of execution of the smart contract using only one endorser. The proof of correctness of execution is interchangeably referred as proof throughout the description and may be construed accordingly. However, for efficiency purpose there can be more than one proving endorser, to tolerate byzantine endorser. Further, enables verifying the smart contract by multiple endorsers. The smart contract associated with the proof, referred herein as a vericontract, is executed to generate the output and the proof using one of a) Verifiable Computing (VC) approach, b) a Trusted Execution Environment (TEE) approach and c) a hybrid approach (combination of VC and TEE). As understood by persons skilled in the art, smart contract execution is time consuming as compared to verification. Thus, the veriblock architecture enables verifying the integrity of the smart contract execution in a manner to reduce transaction latency by reducing number of endorsers required to execute the smart contract. Further, the system provides two options with an endorser-verify model and a committer-verify model for verification of the executed contract. The system refers to usage of only single endorser being enough for smart contract execution, however, the system disclosed herein defines one or more endorsers for executing the smart contract. The one or more endorsers for smart contract execution are provided to handle crash fault. Thus, system ensures not to rely on or bet solely dependent on one endorser so that the smart contract execution and proof generation process is not hampered even if any endorser crashes. If one or more endorser crashes, outputs from remaining endorsers is readily available for further processing and any one output among the multiple outputs can be used.

The veriblock architecture, disclosed herein, is agnostic to various record keeping models used by the blockchain networks such as UTXO (Unspent transaction output) or Account/balance model (world state).

Referring now to the drawings, and more particularly to FIGS. 1A through 8C, where similar reference characters denote corresponding features consistently throughout the figures, there are shown preferred embodiments and these embodiments are described in the context of the following exemplary system and/or method.

FIG. 1A is a functional block diagram of a system 100, interchangeably referred as a blockchain network, for processing transactions in the blockchain network, in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 or the blockchain network 100 is a distributed computing environment with one or more hardware processor distributed across a plurality of nodes of the blockchain network 100 to execute functions of one or more functional blocks of the system 100, implementing the execute-order-commit type blockchain platform. The functional blocks of the system 100 include a) clients 110 configured at multiple nodes among the plurality of nodes, b) endorsers 112, configured on one or more nodes selected in accordance with an endorsement policy of the blockchain network, c) multiple orderers 114 configured on a first set of nodes among the plurality of nodes of the blockchain network 100), d) multiple committers 116 configured on a second set of nodes among the plurality of nodes of the blockchain network 100, e) a scheduler 118, associated with execution of the smart contract, configured on a node and f) many other standard functional blocks (not shown), configured on one or more nodes, that are required for working of the execute-order-commit type blockchain platform. The scheduler 118 is present in the veriblock architecture. The scheduler 118, which includes a scheduler component and a scheduler agent, is part of the blockchain network, where it interacts with the user and endorsers.

Even though, the system 100 is explained in conjunction with execute-order commit blockchain framework, the system 100 may also be applied for order-execute type blockchain network with minimal modification. For, the order-execute type blockchain network, the system 100 follows committer-verify model disclosed herein. In such scenarios, after ordering, the transactions in the block are executed by a single proving node and then the proving node broadcasts results and proof to all the remaining nodes. Other nodes then verify and commit block into the blockchain.

The veriblock architecture, disclosed herein, is agnostic to various record keeping models used by the block chain networks for record keeping such as UTXO (Unspent transaction output) or Account/balance model (worldstate). In UTXO (Unspent Transaction Output) model, one or more participating peers (proving peers) run the vericontract and provide the result and proof of smart contract execution to other participating peers (verifying peers), then the other peers endorses the transaction by verifying the proof and then send it to notary. The notary further validates the endorsed transaction and sends the notarized transaction to the peers, which record the transaction locally and store relevant states in the vault.

Hyperledger Fabric (HLF): an example of execute-order-commit type of blockchain network: The HLF is a prominent permissioned blockchain platform based on the execute-order-commit process. The HLF network provides a consistent distributed ledger, shared by a set of nodes, alternatively referred in as peers hereinafter. In HLF, the peer is a network entity of the system or blockchain network 100, which maintains a ledger and runs the smart contract, referred as a chaincode in HLF, in order to perform read and/or write operations to the ledger. The peers are owned and maintained by members. Fundamentally there are three types of peers in the HLF network: endorsing peers (EPs) also referred as endorsers, orderers (OPs) and committing peers (CPs) or committers. The EPs (nodes) validate the transaction and execute the chaincode. The EPs simulate transactions in an isolated chaincode containers and prepares transaction proposal based on smart contract results (outcome of the transaction). The OP is responsible for maintaining consistent ledger state across the HLF network. This node collects transactions from multiple client applications and orders transactions into a block for all channels on the network. A Channel can be considered as subnetwork which has their own participants and maintain their own ledger in HLF. After creating the block, OPs deliver blocks to the committing peer(s) which include EPs on a channel. The orderer is built on top of a message oriented architecture. There are multiple options currently available such as Solo, Kafka, and Raft. Upon receipt of a block from OPs, each of the CPs validate every transaction within a block. For every transaction, peer verifies that the transaction has been endorsed by the required organizations according to the endorsement policy of the chaincode. The peer also performs a ledger consistency check to verify that the current state of the ledger is compatible with the state of the ledger when the proposed update was generated. After validation, peer marks each transaction in the block as valid or invalid. The ledger gets updated for all the valid transaction and for invalid transactions are not applied to the ledger.

Hyperledger Fabric Transaction Flow: Hyperledger Fabric works on Execute-Order-Commit architecture. The main steps involved in the Hyperledger Fabric transaction flow are: 1) Client application initiates the transaction to invoke a particular chaincode function. 2) EPs verify the signature and execute the chaincode function against the current state database and produce transaction results including a response value, read set, and write set. The set of these values, along with the endorsing peer's signature is sent back as a proposal response to the client application. 3) Client assembles endorsements into a transaction and broadcasts it to the Ordering Service. 4) Ordering Service arranges transactions chronologically and creates blocks of transactions per channel and broadcasts the blocks of transactions to all CPs on the channel. 5) CPs validate all transactions within the block to ensure endorsement policy is fulfilled and to ensure that there have been no changes to ledger state for read set variables since the read set was generated by the transaction execution (Step 2). After validation, CPs finally commit the transactions locally.

Smart Contract (chaincode): A smart contract in Hyperledger Fabric is a program, called chaincode. The chaincode is the place where business logic is defined for any application. Through chaincode, transaction execution or query transactions are invoked. The chaincode runs in an isolated docker container from the (endorsing) peer process. The chaincode needs to be installed on every peer that interacts with the ledger and to access the world state. It also needs to be instantiated on the channel. After that, end users can invoke chaincode functions through a client-side application that interfaces with a network peer. Every chaincode must have implemented two core functions: Init and Invoke. The Init( ) function is called during chaincode instantiation and the purpose is to prepare ledger for the future requests. This function is used to do any initialization's as per our chaincode needs.

Figure 1B:
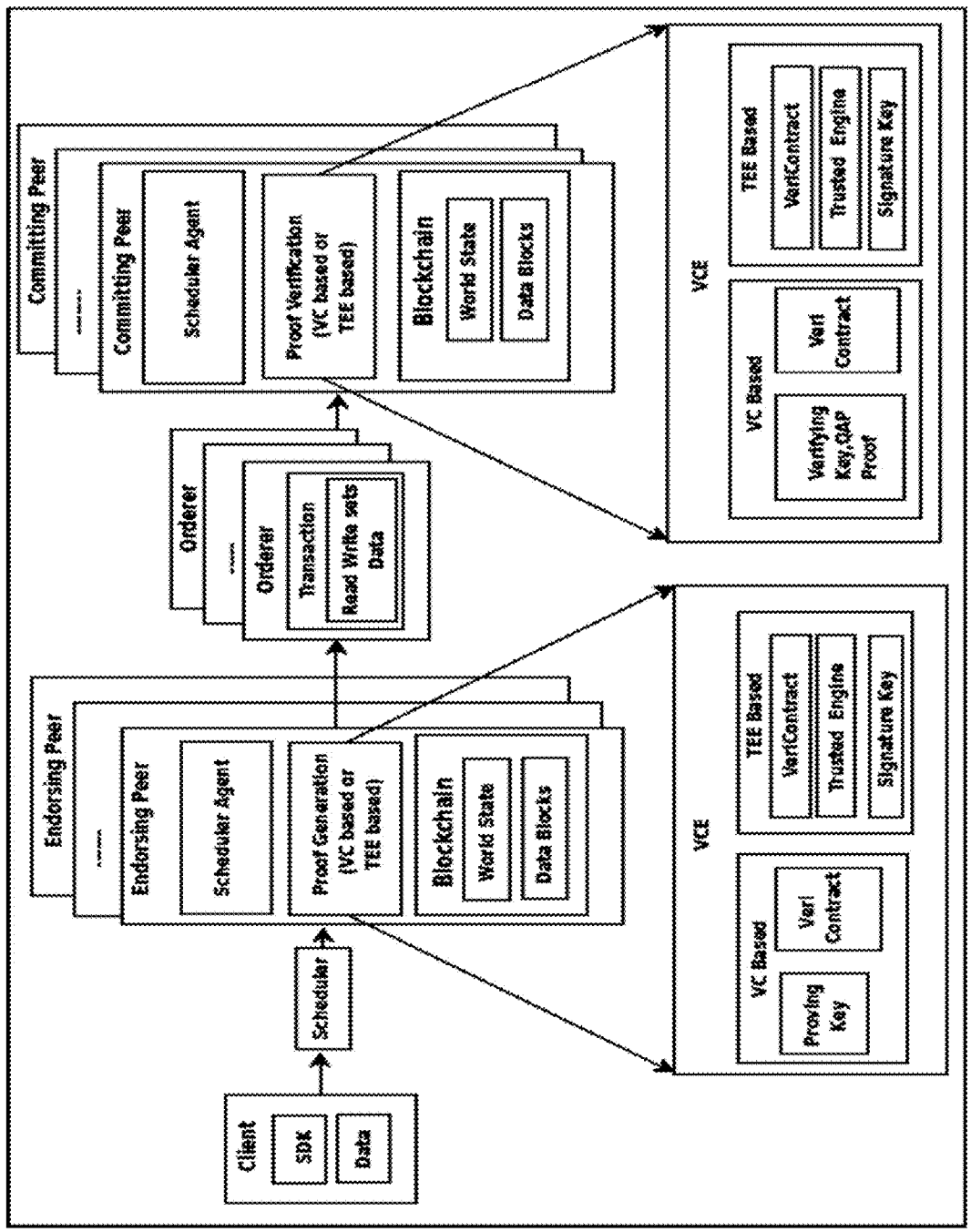
FIG. 1B is an example high level architecture view of the system of FIG. 1A, alternatively referred as veriblock architecture, depicting an endorser-verify model and a committer-verify model for processing the transactions in the blockchain network FIG. 2A

FIG. 1B depicts the veriblock architecture, which describes the modifications and variations provided by the veriblock architecture to the existing execute-order-commit platform such as the HLF. The modifications facilitate a new blockchain process for executing a transaction request, which enables verifying the integrity of the smart contract execution in a manner to reduce transaction latency by reducing number of endorsers executing the smart contract. The embodiments herein, utilize HLF as an example blockchain platform to explain the processing of blockchain transactions in accordance with the veriblock architecture. However, it can be understood by ordinary persons skilled in the art that this can be equally applicable to any execute-order-commit blockchain platform with none or minimal modifications to the process explained herein.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. The memory 102 is represents memory distributed across the plurality of nodes or network entities of the blockchain network or the system 100. In an embodiment, the system 100 can be implemented in a variety of computing systems, that are network entities of the blockchain network or the system 100. The computing systems include laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface (s) 106 can include one or more ports for connecting a number of devices (nodes) of the system 100 to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Thus, the memory 102 may comprise information pertaining to input(s)/output(s) of each step performed by the processor(s) 104 of the system 100 and methods of the present disclosure. Functions of the components of system 100 are explained in conjunction with the veriblock architecture of FIG. 1B and FIG. 2A through FIG. 8C.

FIG. 1B is an example high level architecture view of the system 100 of FIG. 1A, alternatively referred as the veriblock architecture, depicting an endorser-verify model and a committer-verify model for processing the transactions in the blockchain network. In the veriblock depicted in FIG. 1B, for a given input (transaction) single node executes the smart contract and produces a Proof of Correctness (POC), which is also referred throughout the description as proof of correctness of execution, and corresponding output of transaction execution. The other nodes in the blockchain network, verify the POC of the contract execution, without simulating (executing) it. In case of VC based approach (alternatively referred as simply the VC approach), the proof, for example, can be set of Quadratic Arithmetic Polynomials (QAPs) generated during execution for a given input and output. For the TEE based approach (Intel SGX), the proof is the signature on the output generated by running the smart contract in the enclave memory. In order to ensure the integrity and security of the transaction inputs, the inputs are hashed and part of the signed output. As part of the transaction execution, input hashes are matched against the signed inputs provided by the user during transaction invoke. The verifying endorsers also validates the same. In veriblock, the proof verification is envisaged in two models: 1) endorser-verify Model—Proof generation and verification happens at endorsing phase 2) committer-verify model—Proof generation happens at endorsing phase and verification happens at committing phase.

Figure 3A:
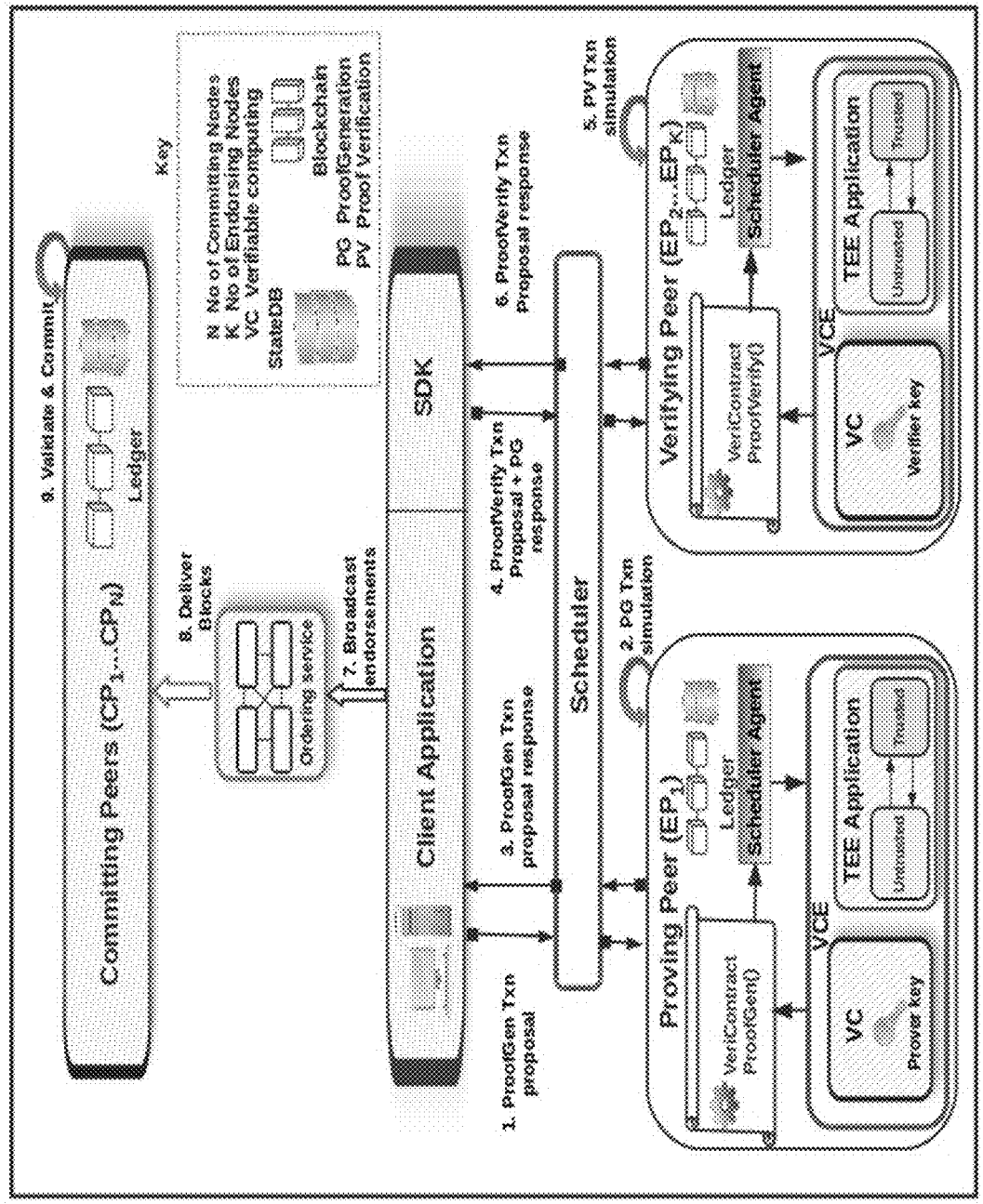
FIG. 3A illustrates a functional block diagram of the system of FIG. 1B implementing the method of FIG. 2A and FIG. 2B in accordance with the endorser-verify model based approach, in accordance with some embodiments of the present disclosure.
Figure 3B:
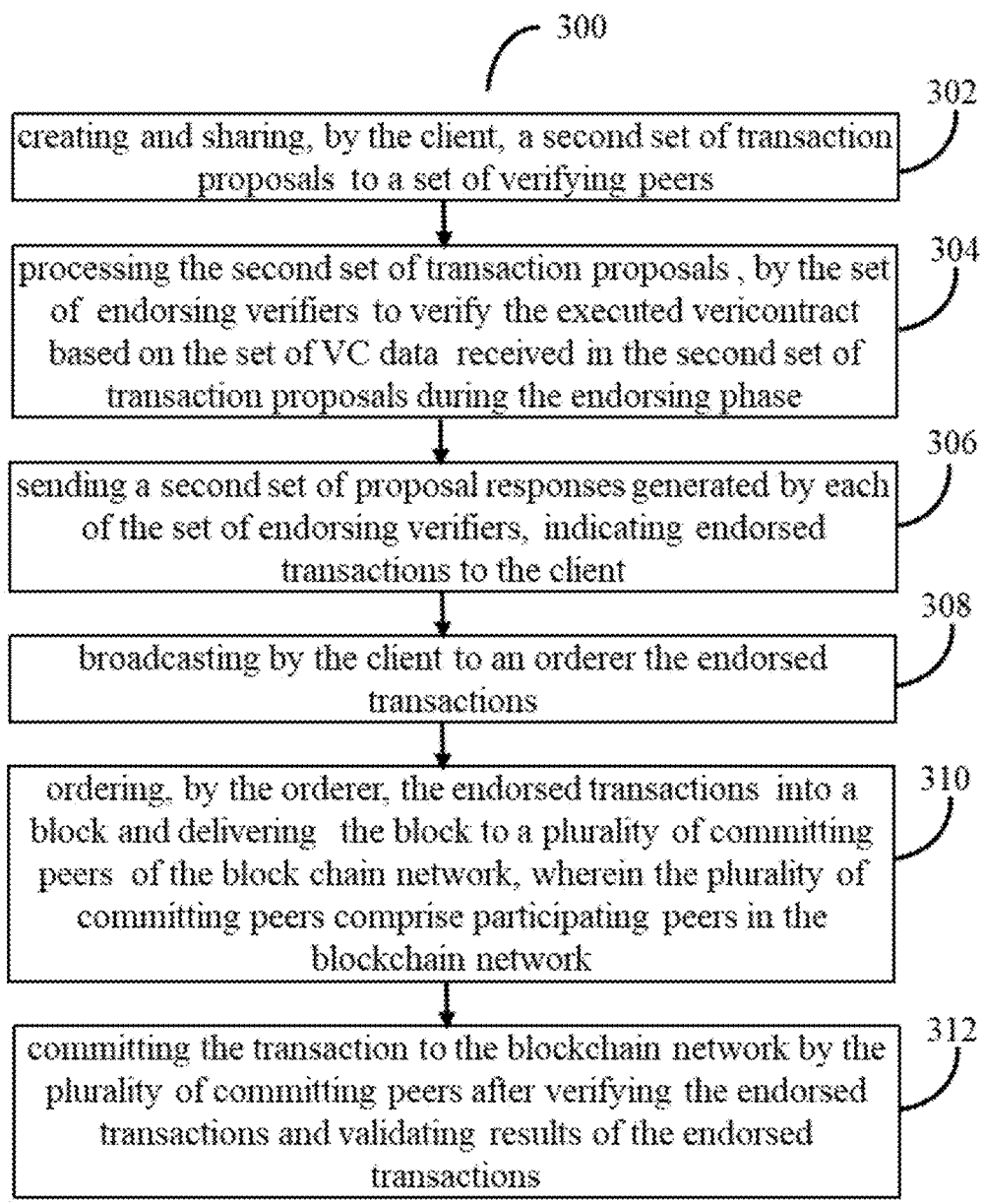
FIG. 3B illustrates a process of the method of FIG. 2A and FIG. 2B in conjunction with FIG. 3A for the endorser-verify model based processing of the transactions in the blockchain network, in accordance with some embodiments of the present disclosure.

In endorser-verify Model, proof generation and verification are done at the endorsing phase. Single endorsing peer executes the smart contract functionality and generates the proof and remaining endorsing peers in the blockchain network verify the proof without executing the smart contract functionality. As mentioned earlier, the single endorser is enough for smart contract execution, however, the system 100 disclosed herein defines one or more endorsers (referred as one or more proving peers) for executing the smart contract to handle crash fault so that the smart contract execution and proof generation process is not hampered even if the endorser crashes. Further, even though one or more proving peers perform the same task of smart contract execution and proof generation, the validation at committer end is performed using verification data from only single proving peer. The number of proving peers may be selected based on the level of security needed for the application using the blockchain network. For example, in order to tolerate byzantine fault, 2t+1 nodes (odd number of nodes) are required, where 't' is the number of faulty nodes (herein proving peers) Thus, when the system 100 receives multiple instances of verification data from the one or more proving peers, the system 100 is configured to process the first received verification data to validate the transaction. The functions of the system 100 disclosed herein are explained with assumption that only one endorser is a proving peer performing the smart contract execution and proof generation for explaining the invention and doesn't impose any limitation. Thus, the same can be implemented for multiple proving peers by considering verification data from only one proving peer among the multiple proving peers. The complete flow of endorser-verify Model is depicted in FIGS. 3A and 3B. In an embodiment, the system 100 can process the multiple verification requests received from all verifiers, and further based on the majority, transaction can be endorsed.

Figure 4A:
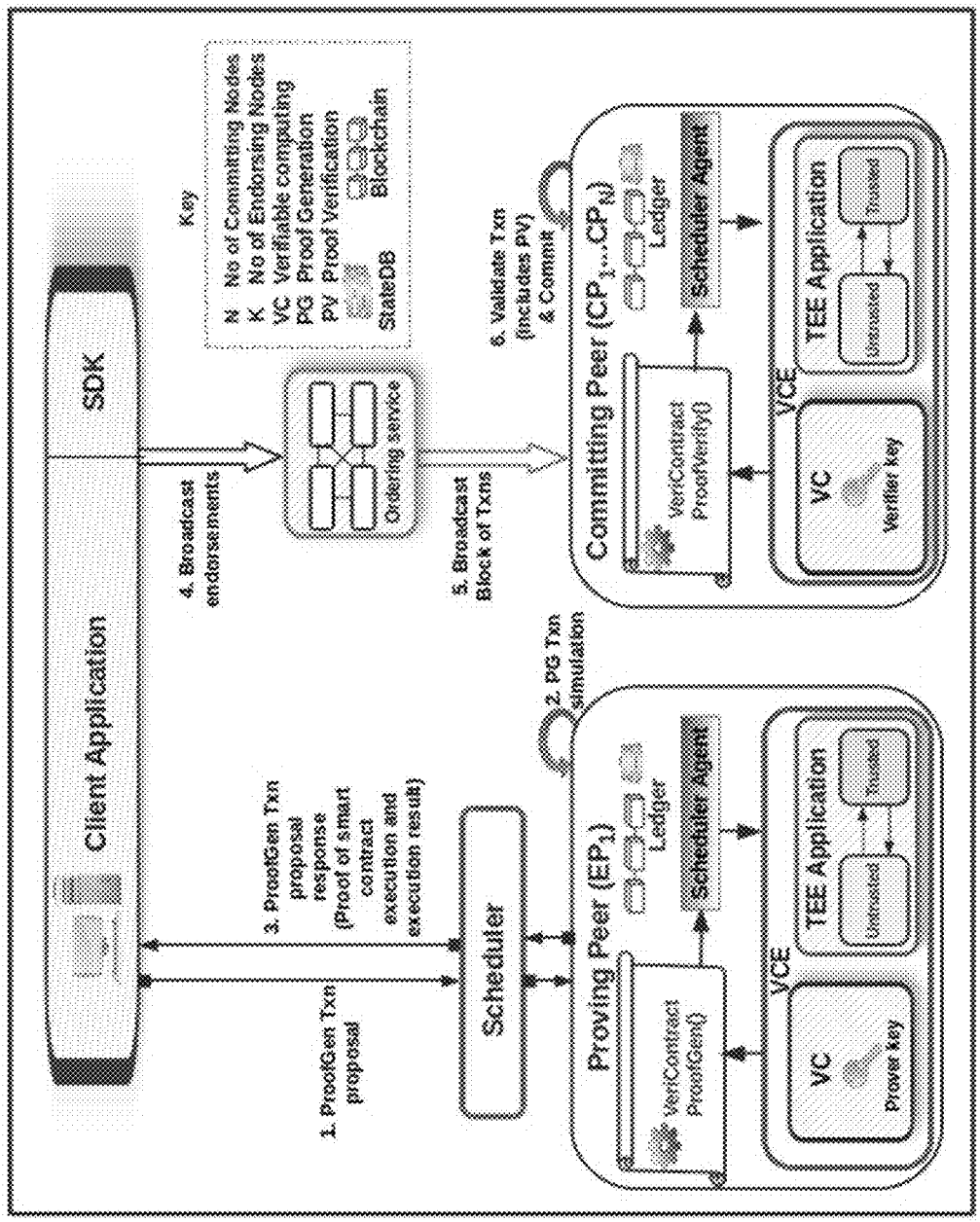
FIG. 4A illustrates a functional block diagram of the system of FIG. 1B implementing the method of FIG. 2A and FIG. 2B in accordance with the committer-verify model based approach, in accordance with some embodiments of the present disclosure.
Figure 4B:
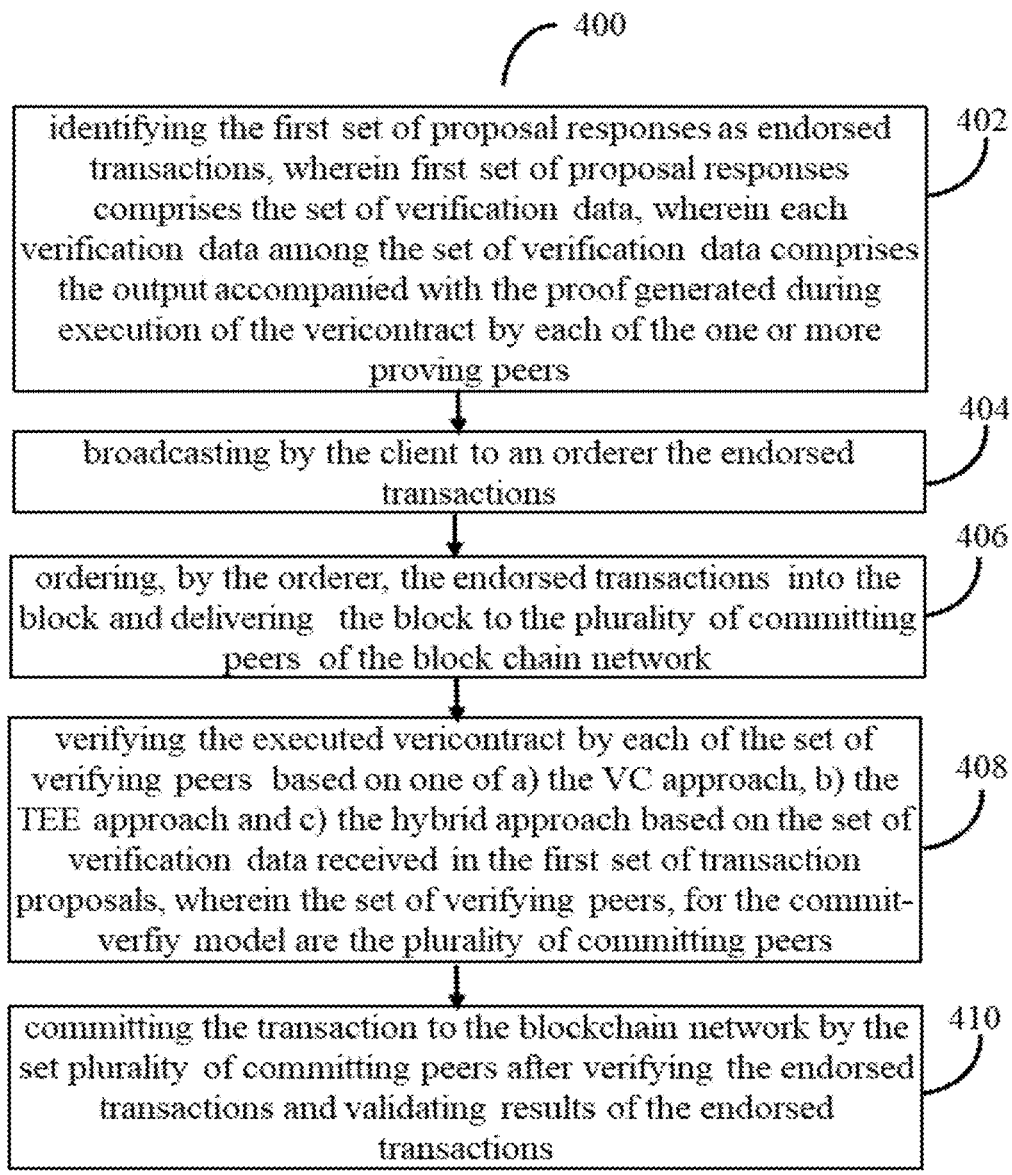
FIG. 4B illustrates a process of the method of 2A and FIG. 2B in conjunction with FIG. 4A for the committer-verify model based processing of the transactions in the blockchain network, in accordance with some embodiments of the present disclosure.
Figure 5:
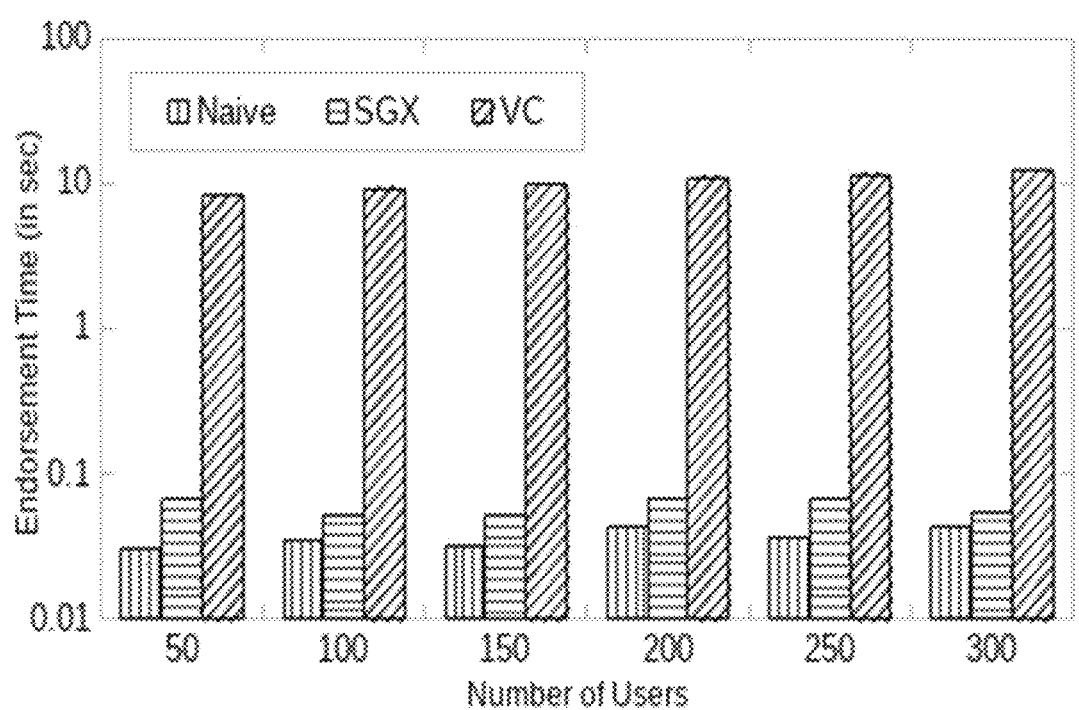
FIG. 5 through FIG. 7 provide graphical performance analysis of the system of FIGS. 1A and 1B utilizing the veriblock architecture for processing of the transactions for a bidding use case in the blockchain network, in accordance with some embodiments of the present disclosure.

In committer-verify model, proof generation happens at endorsing phase by single endorser and verification happens by all committers at committing phase. In the HLF network, single endorsing peer executes the smart contract functionality for a given transaction and produces the proof. At committing phase, all committers verify the proof. The complete flow of committer-verify model for fund transfer use case wherein amount of money is transferred from a sender account to receiver account is depicted in FIG. 4A and FIG. 4B. The veriblock contains the same entities or functional as the regular HLF blockchain network. In the veriblock, each peer has an additional proof generation component called Verifiable Computing Engine (VCE) comprising a VC algorithm like Pinocchio and TEE like Intel SGX. The smart contract that is run using this proof generation component is called as vericontract. This is different from the traditional smart contract where herein along with output generated by the smart contract the proof of correctness of the execution of the smart contract is generated. Essentially, the endorser generates a proof for executing the chaincode related to smart contract using VCE. Similarly, VCE is also used for verification.

Figure 2A:
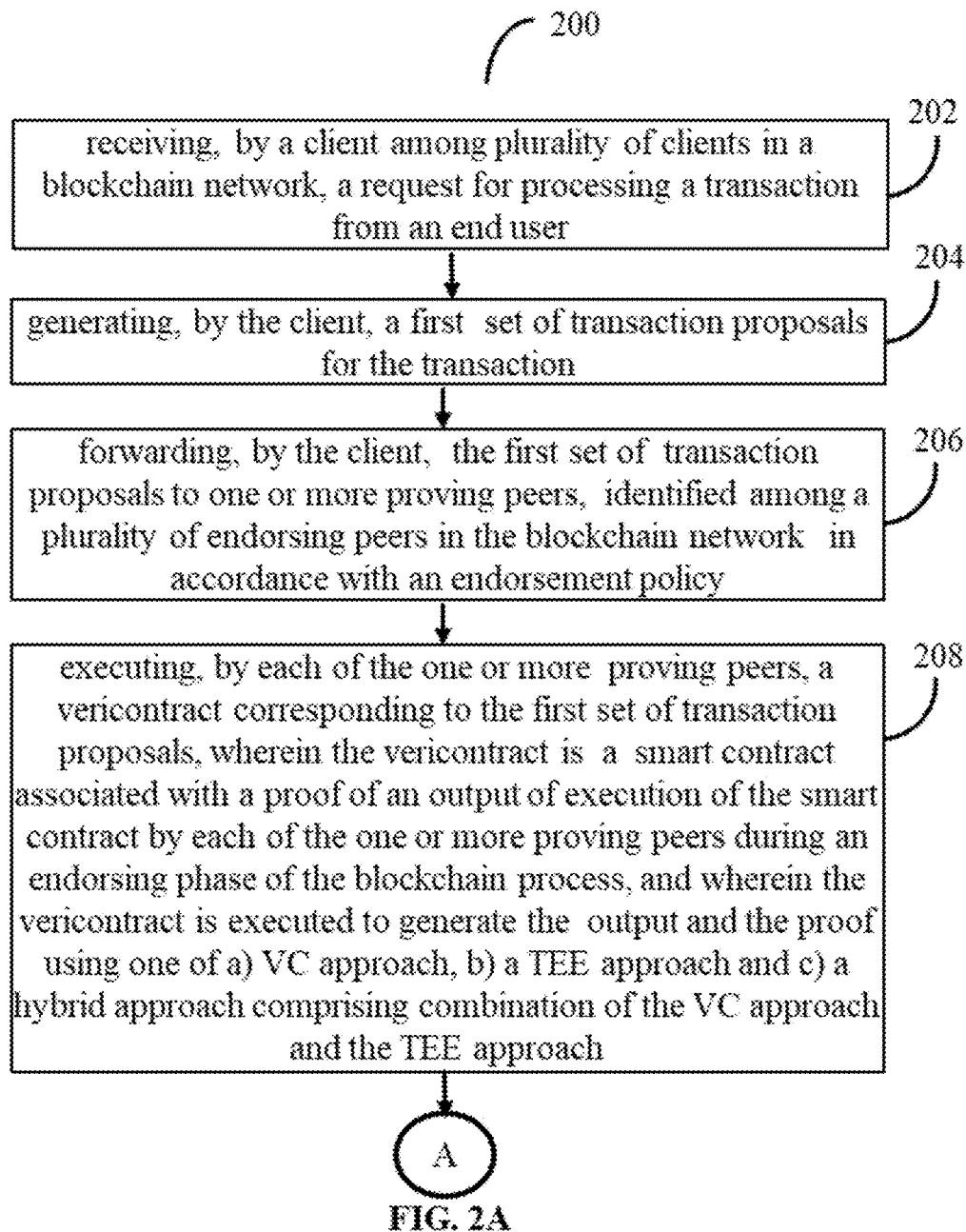
FIG. 2B is a flow diagram illustrating a method for processing transactions in a blockchain network, using the system of FIGS. 1A and 1B, in accordance with some embodiments of the present disclosure.
Figure 2B:
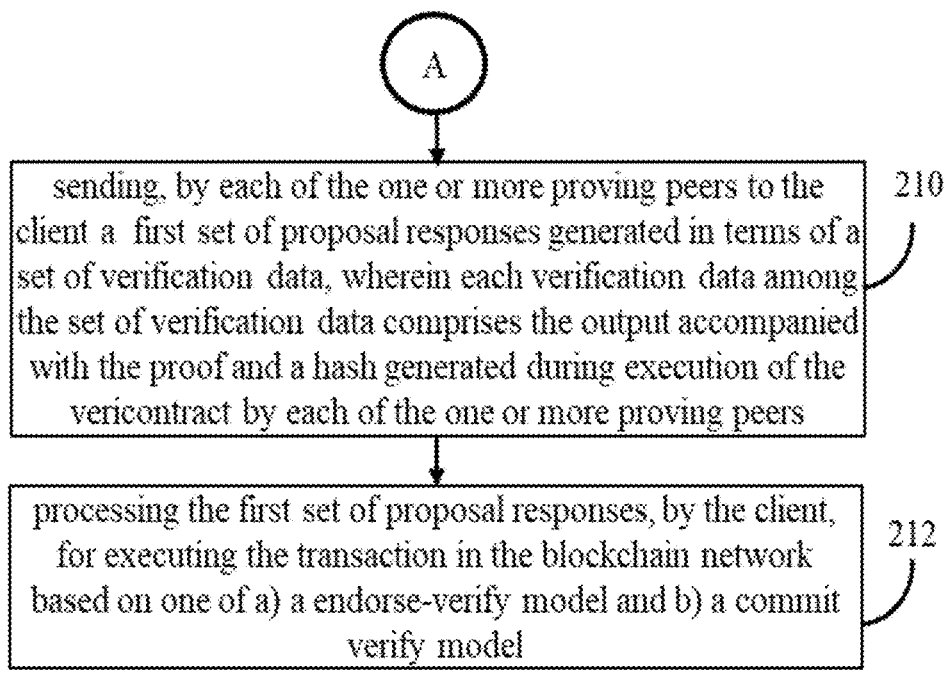

FIG. 2A and FIG. 2B depict a flow diagram illustrating a method 200 for processing transactions in the blockchain network, using the system 100 of FIGS. 1A and 1B, in accordance with some embodiments of the present disclosure.

In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIGS. 1A and 1B and the steps of flow diagram as depicted in FIG. 2A through FIG. 4B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202, the one or more hardware processors 104 are configured to receive via a client among plurality of clients 110 in the blockchain network 100, a request for processing a transaction from an end user. At step 204, the one or more hardware processors 104 are configured to generate via the client, a first set of transaction proposals for the transaction. At step 206, the one or more hardware processors 104 are configured to forward via the client the first set of transaction proposals to one or more proving peers (also alternatively referred as proving endorsing peers), which are identified among a plurality of endorsing peers in the blockchain network in accordance with an endorsement policy. The one or more proving peers are utilized to handle crash fault scenarios, wherein the set of verifying peers verify the first received verification data to validate the transaction.

At step 208, the one or more hardware processors 104 are configured to execute via each of the one or more proving peers, a vericontract corresponding to the first set of transaction proposals. The vericontract is the smart contract associated with the proof of correctness of execution of the smart contract by each of the one or more proving peers during an endorsement phase of a blockchain process. Further, the system 100 is configured to execute the vericontract, to generate an output and the proof, using one of a) Verifiable Computing (VC) approach, b) a Trusted Execution Environment (TEE) approach and c) a hybrid approach comprising combination of VC and TEE.

Hybrid approach: a combination of VC and TEE: Executing the vericontract by each of the one or more proving peers to generate the output of the smart contract computation and the proof of the computation using the hybrid approach comprises following steps:

1) partitioning the smart contract into a plurality of modules using the scheduler 118. The scheduler 118, which includes the scheduler component and the scheduler agent, is part of the blockchain, where it interacts with the end user and endorsers. The scheduler component is meant for maintaining the information about the list of peers and the operations they support such as VC or TEE or both. The scheduler agent is meant to schedule the jobs for VC or TEE at the peer level. The scheduler agent fetches the list of peers and supported operations from the scheduler, collects the proof of contract executions based on the list and aggregates the proofs. When transaction reaches the scheduler 118 based on risk level, the scheduler 118 schedules all high risk operations to VC and low risk operations to the TEE. At these two places the transactions are executed, and proofs are generated and consolidated as a single proof. Alternatively, both the proofs can be forwarded to the scheduler agent for consolidating these proofs as a single proof. During proof verification, scheduler agent segregates the proof into TEE and VC based approaches and forward those proofs to respective units. Thus, the scheduler 118 schedules:
    a) a first set of modules among the plurality of modules having dependency on each other to run in sequential manner. Each of the first set of modules are assigned a unique name and tagged with a sequence type as sequential; and
2) b) a second set of modules among the plurality of modules that are independent to be run in parallel. Each of the second set of modules are assigned a unique name and tagged with the sequence type as parallel identifying a proof type for each of the first set of modules and the second set of modules based on a set of parameters associated with each of the plurality of modules, wherein the set of parameters comprises risk level, execution time, execution cost and the like, and wherein
    a) modules, among the first set of modules and the second set of modules, satisfying a first parameter criteria are run using the VC approach; and
    b) modules, among the first set of modules and the second set of modules, satisfying a second parameter criteria are run using TEE approach.

For example, if high security, low cost and delay tolerable transactions can be executed using VC and whereas less security, high cost and less latency requirements of a transaction can be executed using TEE approach. Or other way, if there is a less dependency on the given module, this can be executed using VC. Whereas, if there is a high dependency on the given module, that module can be executed using TEE. Similarly, sequential modules can be executed in TEE, whereas parallel modules can be executed using VC.

3) generating the proof and storing the proof in a template, wherein the template comprising ModuleName: <Name>, ProofType:<VCE/TEE>, SequenceType: <Sequential/Parallel>, and Proof Data; and
4) aggregating the proof from the first set of modules and the second set of modules generated using the VC approach and the TEE approach by concatenating, wherein the aggregated proof along with the output is sent as the verification data for verification to the set of verifying peers.

The hybrid approach is preferred when intermediate performance of TEE and VC is desirable, giving advantages of both approaches. The hybrid approach may also be used when there is need for load balancing or division of labor among VCs and TEEs.

VC approach: Verifying the executed vericontract by the set of verifying peers based on the set of verification data received in the second set of transaction proposals, using the VC approach comprises executing the smart contract entirely using VC approach without partitioning the smart contract. The VC approach is used if transactions requires high end security with low cost and high latency TEE approach: Verifying the executed vericontract by the set of verifying peers based on the set of verification data received in the second set of transaction proposals, using the TEE based approach comprises executing the smart contract entirely using TEE without partitioning the smart contract. The TEE based approach is selected if transaction requires high cost with low latency and medium to low security.

At step 210, the one or more hardware processors 104 are configured to process the first set of proposal responses, via the client, for executing the transaction in the blockchain network based on one of a) an endorser-verify model and b) a committer-verify model. In an embodiment, both models can be used in the same blockchain framework and a flag in the transaction structure can indicate the type of model to be used for the transaction execution.

A) Endorser-verify model: FIG. 3A illustrates a functional block diagram of the system of FIG. 1B implementing the method of FIG. 2A and FIG. 2B in accordance with the endorser-verify model based approach and FIG. 3B illustrates a process 300 of the method of FIG. 2A and FIG. 2B in conjunction with FIG. 3A for the endorser-verify model based processing of the transactions in the blockchain network. Processing the first set of transaction proposal responses in accordance with the endorser-verify model comprises:
- a) creating and sharing (302), by the client, a second set of transaction proposals to a set of verifying peers, wherein the second set of transaction proposals are generated for the received first set of proposal responses and comprises the set of verification data, and wherein the set of verifying peers are a set of endorsing verifiers identified among the plurality of endorsing peers in accordance with the endorsement policy for the endorser-verify model;
- b) processing (304) the second set of transaction proposals, by the set of endorsing verifiers to verify the executed vericontract based on the set of verification data received in the second set of transaction proposals during the endorsement phase, wherein the verification is performed in accordance with a) the VC approach, b) the TEE approach and c) the hybrid approach used during execution of the vericontract. The one or more hardware processors are configured to verify the executed vericontract via each of the set of verifying peers based on the set of verification data received in the second set of transaction proposals using the hybrid approach comprises:
  1) parsing the verification data based on the ProofType and the SequenceType to be processed for proof verification in accordance to the VC approach or the TEE approach based on the proof type and the sequence type;
  2) validating the proof using one of the VC approach or the TEE approach by each of the set of verifying peers in accordance with ProofType present in the verification data; and
  3) declaring the executed vericontract as valid if the proof is validated by each of set of verifying peers.
- c) sending (306) a second set of proposal responses generated by each of the set of endorsing verifiers, indicating endorsed transactions to the client in response to the processed second set of transaction proposals;
- d) broadcasting (308) by the client to an orderer the endorsed transactions;
- e) ordering (310), by the orderer, the endorsed transactions into a block and broadcasting the block to a plurality of committing peers of the blockchain network, wherein the plurality of committing peers comprise participating peers in the blockchain network; and
- f) committing (312) the transaction to the blockchain network by the plurality of committing peers after verifying the endorsed transactions and validating results of the endorsed transactions.

B) Committer-verify model: FIG. 4A illustrates a functional block diagram of the system of FIG. 1B implementing the method of FIG. 2A and FIG. 2B in accordance with the committer-verify model based approach and FIG. 4B illustrates a process 400 of the method of FIG. 2A and FIG. 2B in conjunction with FIG. 4A for the commit-verify model based processing of the transactions in the blockchain network. Processing the first set of proposal responses, by the client, for executing the transaction in the blockchain network based on one the committer-verify model comprises:
- a. identifying (402) the first set of proposal responses as endorsed transactions, wherein first set of proposal responses comprises the set of verification data, wherein each verification data among the set of verification data comprises the output accompanied with the proof generated during execution of the vericontract by each of the one or more proving peers;
- b. broadcasting (404) by the client to an orderer the endorsed transactions;
- c. ordering (406), by the orderer, the endorsed transactions into the block and broadcasting the block to the plurality of committing peers of the blockchain network;
- d. verifying (408) the executed vericontract by each of the set of verifying peers based on one of a) the VC approach, b) the TEE approach and c) the hybrid approach based on the set of verification data received in the first set of transaction proposals, wherein the set of verifying peers, for the commit-verify model are the plurality of committing peers; and
- e. committing (410) the transaction to the blockchain network by the set plurality of committing peers after verifying the endorsed transactions and validating results of the endorsed transactions.

Provided below is mathematical model and analysis of the method and system disclosed herein, with reference to FIG. 3A and FIG. 4A. The system 100, disclosing veriblock architecture (interchangeably referred as VeriBlock) as depicted in FIG. 1B consists of various parties such as client C who initiates a transaction, few endorsers EP that run the smart contract and generates a proof and then verify it, the orderers (OPs) arrange the transactions into a block and sends it the committers CPs. Then CPs verify the transaction and commit onto blockchain. The system mathematical model for VeriBlock is:

$$VBC = (P, X, W, S) \tag{1}$$

P={EP,CP,OP,C,VCE} is the set of entities including Endorser Peer (EP), Committer Peer (CP), Orderer (OP) and Client (C).

Here, $n_{EP}$ represents the number of endorsers, $n_{CP}$ are the number of committers and flop are the number of orderers and number of clients $n_C$ respectively and Verifiable Computing Engine (VCE) is the module to run the verifiable computations. VCE runs the proof generation and verification algorithm on the smart contracts run by various entities. SGX is the Intel SGX component which acts as a TEE to run the vericontracts.

X: is the set of blocks $X_1, X_2, \ldots, X_b$, two consecutive blocks are related as $(X_i, X_{i+1}) \in R_c$, such that $R_c = \{(X_i, X_{i+1})/\text{HMAC}(X_i) \in X_{i+1}\}$.

W: is the set of world states $\{W_1, W_2, \ldots, W_t\}$, here 't' is the number of world states applied on the blockchain.

S: $EP \times W_S \rightarrow W'_S$, here S is a smart contract function that is run by the any endorsing peer $P' \in EP$ on few of world state variables $W_S$ (read set), where $W_S \subseteq W$ that are related to smart contract and in this process it modifies a set of world states $W_S'$ (write set), i.e. $S(P', W_S) = W_S'$.

I) Protocol for Verifiable Smart Contract (vericontract): The execution of the smart contract based on VC and SGX (TEE) on to a blockchain is called as vericontract. The vericontract contains three phases comprising: 1) a setup phase for generation of verifiable computing parameters, 2) a vericontract simulation phase for proving peers to run smart contract (chaincode) to generate verifiable proof, and 3) the vericontract verification for verifying the proof and committing the transaction on to the blockchain.

$$\text{vericontract} = (\text{Setup}, \text{VericontractSimulation}, \text{VericontractVerification}) \tag{2}$$

Endorser-verify-model: During the endorsement phase, it is EP who is responsible for generation and verification of the proof. The proof generation and verification happen at transaction endorsing phase. Here, single EP executes the smart contract and remaining EPs verify.

Committer-verify model: On the other hand, in this model, during endorsement the EP executes the smart contract and generates the proof and CP is the one that verifies it in committing phase. Here, single EP executes the smart contract and produces the proof and at committing phase, all CPs verify the proof.

As discussed in Eq. 2 following are the phases involved in the verifiable smart contract or the vericontract. two models for vericontract based on who generates the proof and verifies it.

Phase 0: Setup (Setup): In this phase, the EP executes the VeriContract.

$$\text{Setup}_{(EP,VCE)}(\lambda) = (QAP, PK, VK) \quad (3)$$

a) In case of VCE, the transaction request goes to the VCE for compilation and key generation. The high-level C program is compiled and converted into arithmetic circuits (QAP), which then generates a public proving (PK) and verification (VK) keys with A as security parameter. The key generation depends on the arithmetic circuit. The verification key (VK) is shared with all the CPs and the PK is shared with EP in the blockchain network. The CPs play the role of a verifying peer and EP play the role of a proving peer.

b) In case of Intel SGX based approach, the setup phase includes generation of signature keys and enclave id (identity).

Phase 1: VeriContract Simulation (ProofGen)

In this phase, the EP executes the VeriContract simulation function or smart contract S( ) for generating verifiable proof.

$$\text{ProofGen}_{(EP,VCE)}(W_S, S(\ )) = (RW, PROOF) \quad (4)$$

The VCE proof is generated by EPs using QAP, the PK, and the EP world-state values($W_S$). During this, VCE generates a output (VCE-OUT) and a proof (VCE_PROOF or PROOF). The VCE_OUT is nothing but the read set and write set value (RW). In case of Intel SGX, the PROOF includes the signature of the output generated by the smart contract in the enclave.

The VCE_OUT and VCE_PROOF values are given to peers, who are playing the role of a verifying peer, to verify the execution of smart contract S( ) by EP.

Phase 2: VeriContract Verification (ProofVerify)

$$\text{ProofVerify}_{(P,VCE)}(W_S, RW, PROOF) = \text{ProofValidity} \quad (5)$$

In this phase, the peers execute the VeriContract verification function V( ) to verify the proof VCE_PROOF. • In the VCE, the proof is verified by peers using QAP, the VK, the peer world-state values ($W_S$). During this, VCE generates VCE_OUT(RW) and VCE_PROOF. In addition to the above, the VCE generates a ProofValidity that represents a valid output (VCE_SUCCESS), when or invalid output (VCE_FAILED). In case of success (VCE_SUCCESS), when read write set equals (VCE_OUT), and in case of failure (VCE_FAILED) when read write set is not equal to (VCE_OUT). In case of Intel SGX, the proof verification involves the signature verification on the signed output generated by enclave.

II) VeriContract—Endorser-Verify (EV) Model

In this scheme, one endorser (EP) runs the smart contract and generates the proof and other endorsers verify it. FIGS. 9A through 9G illustrate the entire execution flow as an interaction diagram for VCE based approach based on the functional block diagram of FIG. 3A depicting the endorser-verify model or EV model Phase 1: VeriContract Simulation: In an elaborated manner, in this model the client initiates a transaction and one endorser (prover) in the blockchain executes the chaincode of the smart contract on the current world state parameters and generates a new values to be stored in the world state and updates the read write set. It generates proof using the VCE. It sends proof generated by running the chaincode and read write sets generated during transaction to all the other endorsers (verifiers).

$$\text{ProofGen}_{(EP1,VCE)}^{EV}(W_{S1}, S(\ )) = (RW, PROOF) \quad (6)$$

Phase 2: VeriContract Verification: This is part of transaction endorsement phase for verifying the proof. Here the verifiers verify the proof using their respective VCE component. However, the parallelization can be affected as the client cannot send the transaction proposal to multiple endorsers at once. It needs to wait till the prover executes the chaincode and generate the proof which is forwarded to other endorsers. This may not be a real concern, as client SDK sends the requests to the endorsers one by one anyway. Then the client collects the endorsements from all the endorser and sends for ordering to the orderers. After the ordering of the blocks, the committers verify read write sets as per endorsement policy and commit or reject the transaction.

$$\text{ProofVerify}_{(EP2\ldots N,VCE)}^{EV}(W_{S2\ldots N}, RW, PROOF) = \text{ProofValidity} \quad (7)$$

III) VeriContract—Commit-Verify (CV) Model

In the Verifying Committer model, one endorser runs the chaincode and generates the proof and this is verified by the committers. FIGS. 10A through 10E illustrates the entire execution flow as an interaction diagram based on based on the functional block diagram of FIG. 4A of the committer-verify model (CV model)

Phase 1: VeriContract Simulation: In a broader perspective, one endorser (prover) in the blockchain executes the chaincode and generates proof using the VCE. Now the proof generated by the chaincode and the read write sets are sent to the client itself. Now the client forwards the same for ordering.

$$\text{ProofGen}_{(EP1,VCE)}^{EV}(W_{S1}, S(\ )) = (RW, PROOF) \quad (8)$$

Phase 2: VeriContract Verification: In a nutshell one endorser executes the transaction and produces the proof. At committing phase, all committers verify the proof as a result. Since committing is done by all peers, the verification is executed in all the nodes, which may be an unnecessary overhead. Unlike the EV model (Model 1), only one endorser is involved in the entire endorsement process. After the ordering, the committers receive the block and they become verifiers by verifying the proof generated by the endorser using the VCE.

$$\text{ProofVerify}_{(CP1\ldots N,VCE)}^{CV}(W_{S1\ldots N}, RW, PROOF) = \text{ProofValidity} \quad (9)$$

SECURITY ANALYSIS: This section discusses about the security aspects of our scheme.

Theorem 1. VeriBlock is secure from any malicious Peer.
Proof: According to Eq. 1, there are two cases of malicious peers disrupting VeriBlock.

Malicious Endorser: Assume a malicious endorser EP* submits a transaction with false values (inputoutput*, Proof*), where input∈W. When this transaction is sent to the other EPs, they read the same set of inputs from the W. Now they take the output* and Proof* from the transaction sent by the EP and submit the set to Proof Verification component (VCE or SGX).

$$\text{ProofVerify}_{(P,VCE)}(W_S,RW,\text{Proof}^*)=\text{ProofValidity} \quad (10)$$

Since there is a mismatch among the values in the pair (input,output*,Proof*), the Proof Verification component returns ProofValidity=false. As a result, the transaction is rejected by the VeriBlock.

Malicious Committer: This case is applicable for Commit-Verify (CV) Model where in the CPs perform the proof verification. Suppose a malicious CP' has tried to submit a transaction with malicious proof (Proof*) by tampering it.

$$\text{ProofVerify}_{(CP,VCE)}^{CV}(W_S,RW,\text{Proof}^*)=\text{ProofValidity} \quad (11)$$

In such a case the Proof Verification component returns the ProofValidity=false. Hence the transaction is made invalid one. In case the CP' tampers the ProofValidity bit, then during consensus remaining honest CPs reject the transaction and it is saved as an invalid one.

Theorem 2. A malicious VeriContract cannot successfully commit a transaction on VeriBlock.

Proof: Consider a malicious contract MalContract is installed on EP in the blockchain. Since the other EPs are not malicious the Ordering and Commit are not malicious and are based on Eq. 2. Hence the malicious version is the following:

MalContract=(Setup,VeriContractSimulation*,VeriContractVerification)

Assume that a client C invokes MalContract after submitting its input. Now the endorsing peer EP runs the MalContract on the input and generates the output and updates the world state variables as $S^*(W_S)=W_S'$. For the proof generation, since it is a malicious one it generates a false proof (Proof*), which is not generated from the Proof Generation component.

$$\text{ProofGen}_{(EP)}^*(W_{S1},RW,S^*(\ ))=(W_S',RW,\text{Proof}^*) \quad (12)$$

Now the set $(W_S',RW,\text{Proof}^*)$ is sent to other endorsers. Now the other endorsers run the transaction verification step as follows.

$$\text{ProofVerify}_{(P,VCE)}(W_S,\text{Proof}^*)=\text{ProofValidity} \quad (13)$$

When the other peers are verifying the malicious proof* using the VCE, then the VCE figures out that the proof is malicious and return the ProofValidity=false. If majority of the peers are honest then, they can figure out that the proof is malicious. Hence the transaction generated from a malicious contract is rejected by other peers and is never committed.

PERFORMANCE ANALYSIS: The performance of blockchain based on VC and TEE for proposed VeriBlock (only Endorse-Verify model) is analyzed for a bidding use case. The performance of the bidding use case for both VC based approach and using a trusted third-party Intel SGX platform. The results are tabulated the results the performance is compared.

Pseudo code: Bidding Algorithm
Input: $\text{Party}_1, \text{Party}_2, \ldots, \text{Party}_N$ and Manager. $\text{BidAmt}_1$, $\text{BidAmt}_2, \ldots, \text{BidAmt}_N$
$\text{BidKey}_1, \text{BidKey}_2 \ldots \text{BidKey}_N$
Output: WinnerBid
Phase 0: Bid Submission for $\text{Party}_i$ where $1<i<N$ do
$\text{EBidAmt}_i=\text{EncryptAES}(\text{BidAmt}_i,\text{BidKey}_i)$
$\text{HBidAmt}_i=\text{HMAC}(\text{BidAmt}_i)$
They send the $\text{EBidAmt}_i$ and $\text{HBidAmt}_i$ to the Manager end Phase 1: KeySharing Phase:
for Every $\text{Party}_i$, $1<i<n$ do
Send the $\text{Key}_i$ to Manager end
Phase 2: Open Phase:
The Manager performs the following steps: for i=1 to n do
Decrypt each bid
$\text{BidV al}_i=\text{DecryptAES}(\text{EncBidV al}_i,\text{Key}_i)$ Calculate $\text{cHash}_i=\text{HMAC}(\text{BidV al}_i)$ if ($\text{HashBidV al}_i=\text{cHash}_i$) then $\text{Bid}_i$ is valid.
Add $\text{Bid}_i$ to ListV alidBids. end else
$\text{Bid}_i$ is invalid end
end
WinnerBid=SecondHighestAmong(ListV alidBids)
return WinnerBid EXPERIMENTAL SETUP: The bidding use case is implemented over Hyperledger Fabric v1.4.4 blockchain. The transaction processing is suitably tweaked in Hyperledger fabric to incorporate the VeriBlock design for Endorse-Verify model which is described as following.

Initially client submits transaction to a proving peer which responds to a client with transaction response containing the proof and output values. Later, the client forwards this transaction responses to the verifying peers. At this juncture, this response is modified such that same transaction is sent by the client to the verifier with response values in the transient field of the transaction. Hence these values need not be stored in the blockchain and same time it is available for verification for verifiers. As part of the experimentation, the Hyperledger Fabric blockchain network of four organizations (Org1,Org2,Org3 and Org4) was provisioned, and one peer per organization. Organization IDs are represented as org<n>.example.com and peer IDs are denoted as peer (n).org(n).example.com, respectively, <n>∈{1,2,3,4}. LevelDB is used to store the world state variables and an organization for Orderer (OrderOrg) with single Solo ordering service and channel. Deployed is the bidding use case (determines the second highest bid), implemented on Endorse-Verify model in Golang programming language. Simulations were run on Intel® Xeon® CPU E5-2690 v4 processor with speed 2.60 GHz and 8 GB RAM, running on Ubuntu 18.04 LTS. Note that all the peers, CAs and orderers were all running on separate docker container on the same machine.

VC based Setup: The vericontract is executed based on one of: the VC based, and the Intel SGX based set up. As part of VC based approach, Pinocchio's toolchain based on QAP approach mentioned provided by one of the literature works is used. Created high-level C programs using Pinocchio, it takes these programs as input and converts them into a format suitable for verification. The chaincode running inside a peer communicates with the VCE. Communication between the chaincode instances and the VCE is done via sockets.

Intel SGX based Setup: For the Intel SGX based approach, the architecture includes client application, Hyperledger blockchain and Intel SGX. A bidding use case is built up on Intel SGX Protective Code Loader (PCL) which is an extension to Intel SGX in simulation mode. When the code is converted to an enclave shared object (.so) is encrypted at build time and is decrypted at enclave load time as a result the code details are protected. During the smart contract execution, the EP executes the transaction proposal and of respective use case it calls the Trusted execution environment (TEE) code. The SGX enclave runs the code and signs the output using enclave signature key based on RSA algorithm with 2048 keysize and SHA256 hashing with digest of size 256 bits. The signed output is returned to the EP. This is forwarded to the client. The client sends the transaction proposal response to all EPs for the signature verification of the signed output result. All EPs verify the output result and return the signed endorsement.

Use-cases: Bidding: The performance of the bidding use case for VC and SGX are analyzed by running bidding algorithms with varying number of bid users and the results are tabulated.

Figure 8A:
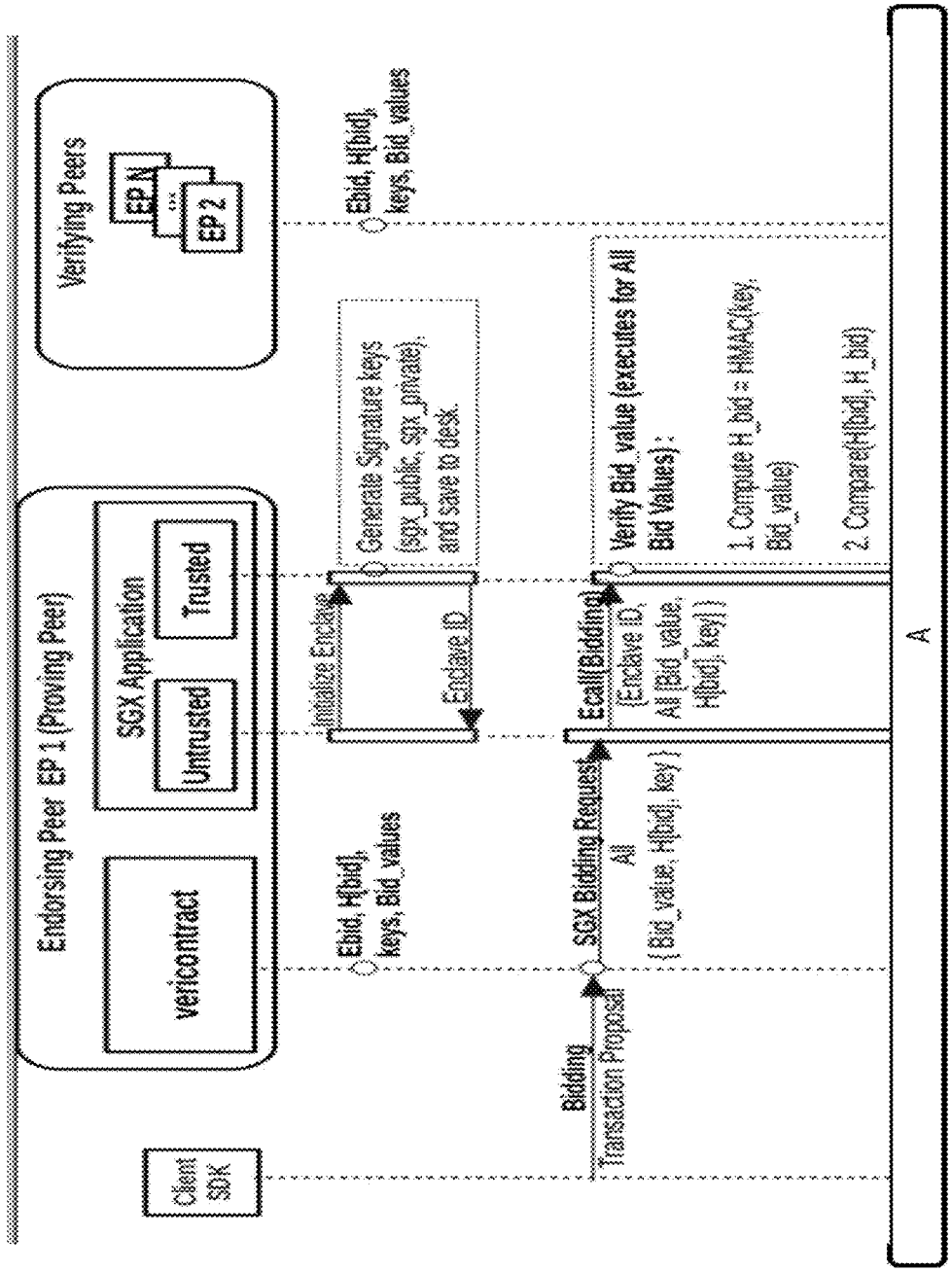
FIG. 8A and FIG. 8B illustrate a bidding use case in Intel SGX Implementation in the endorser-verify model, in accordance with some embodiments of the present disclosure.
Figure 8B:
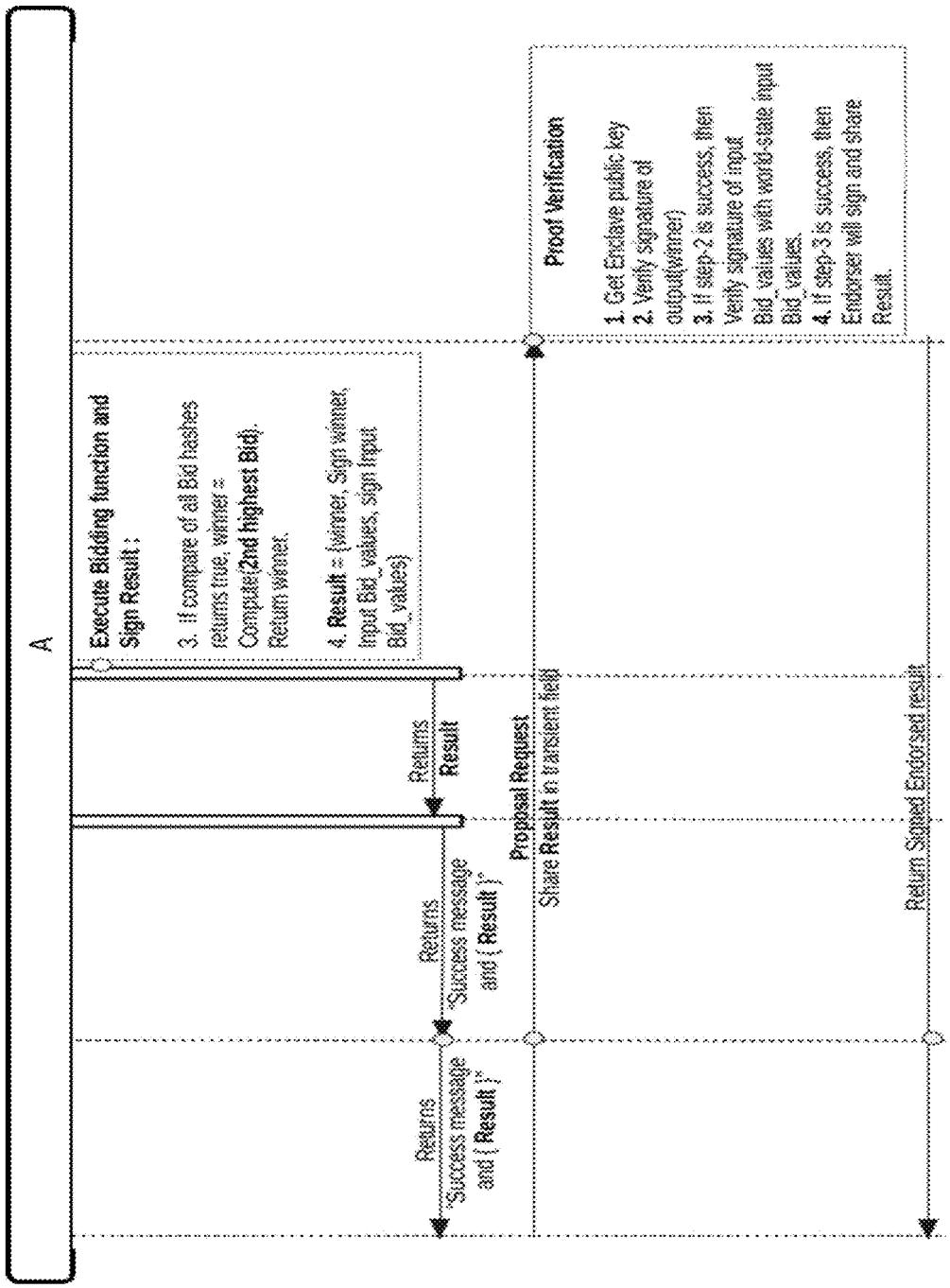
Figure 9A:
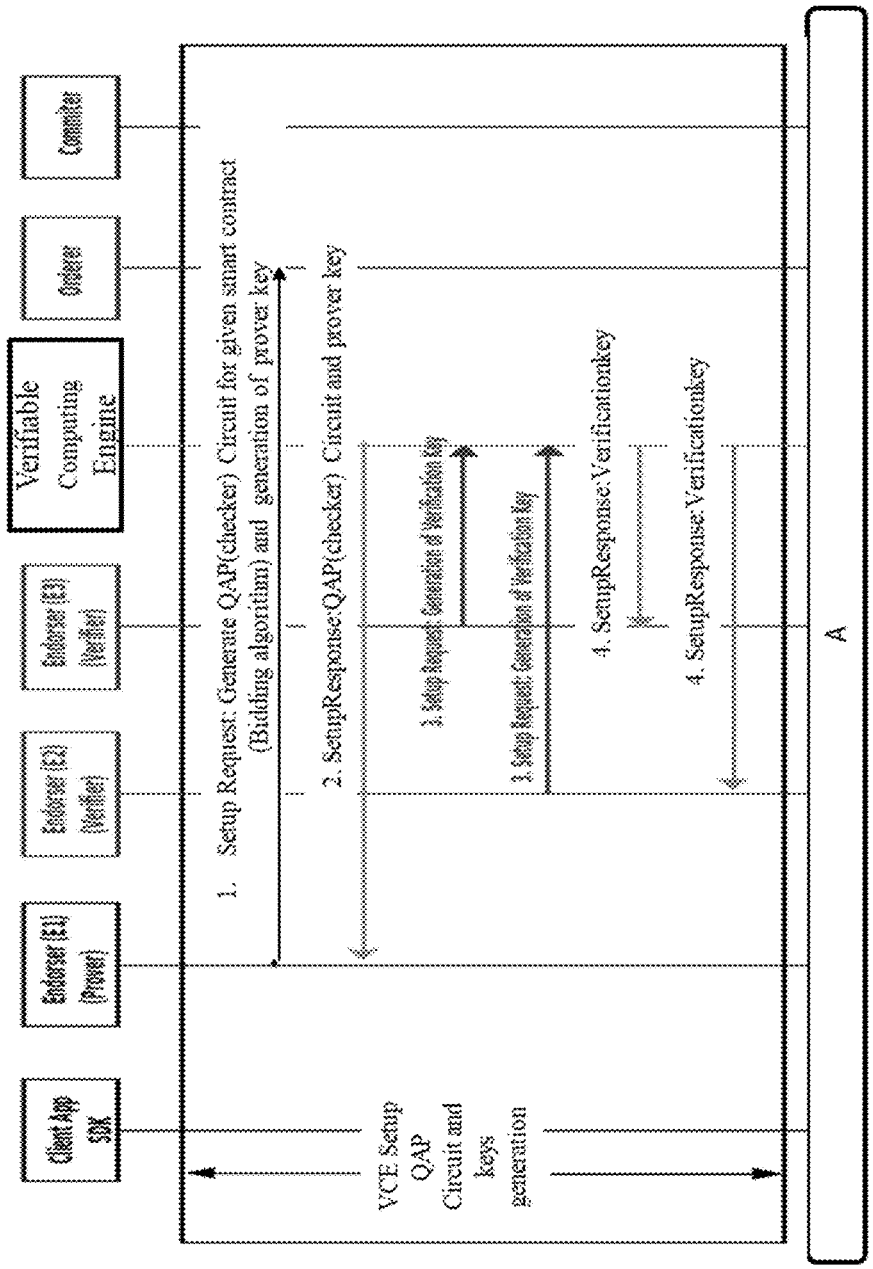
FIGS. 9A through 9G illustrates the bidding use case interaction diagram for bidding use case in the endorser-verify model of the veriblock, in accordance with some embodiments of the present disclosure.
Figure 9B:
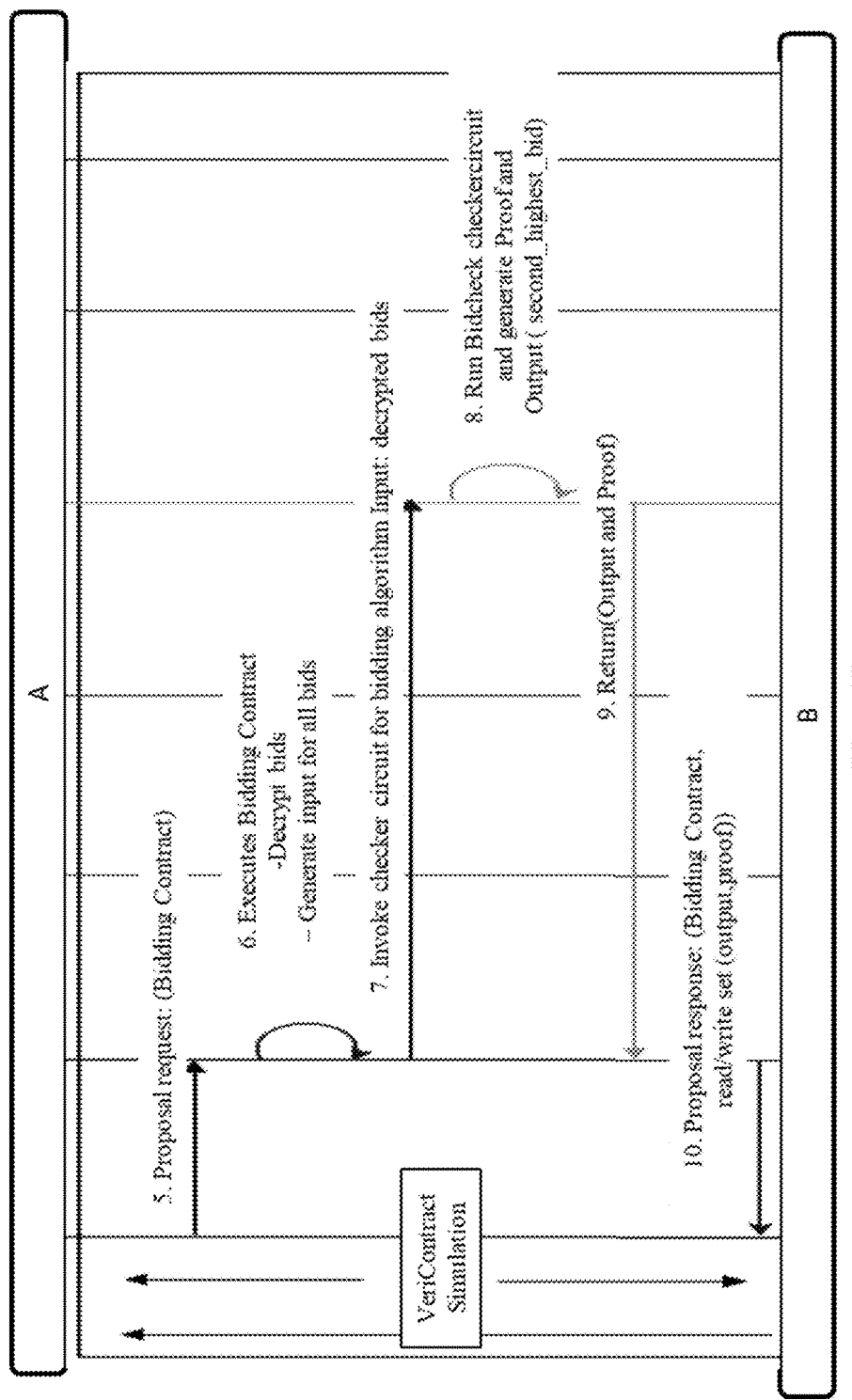
Figure 9C:
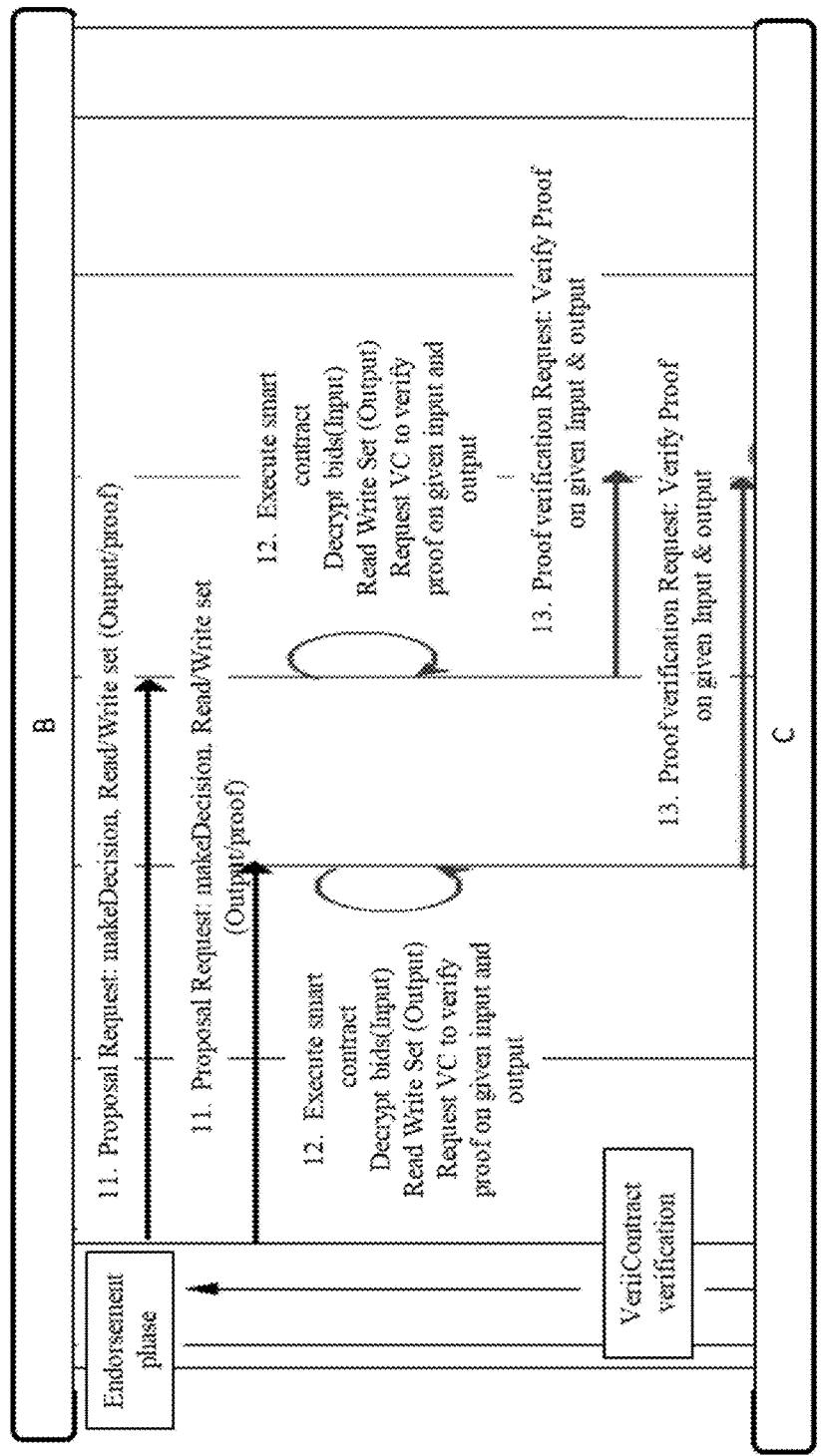
Figure 9D:
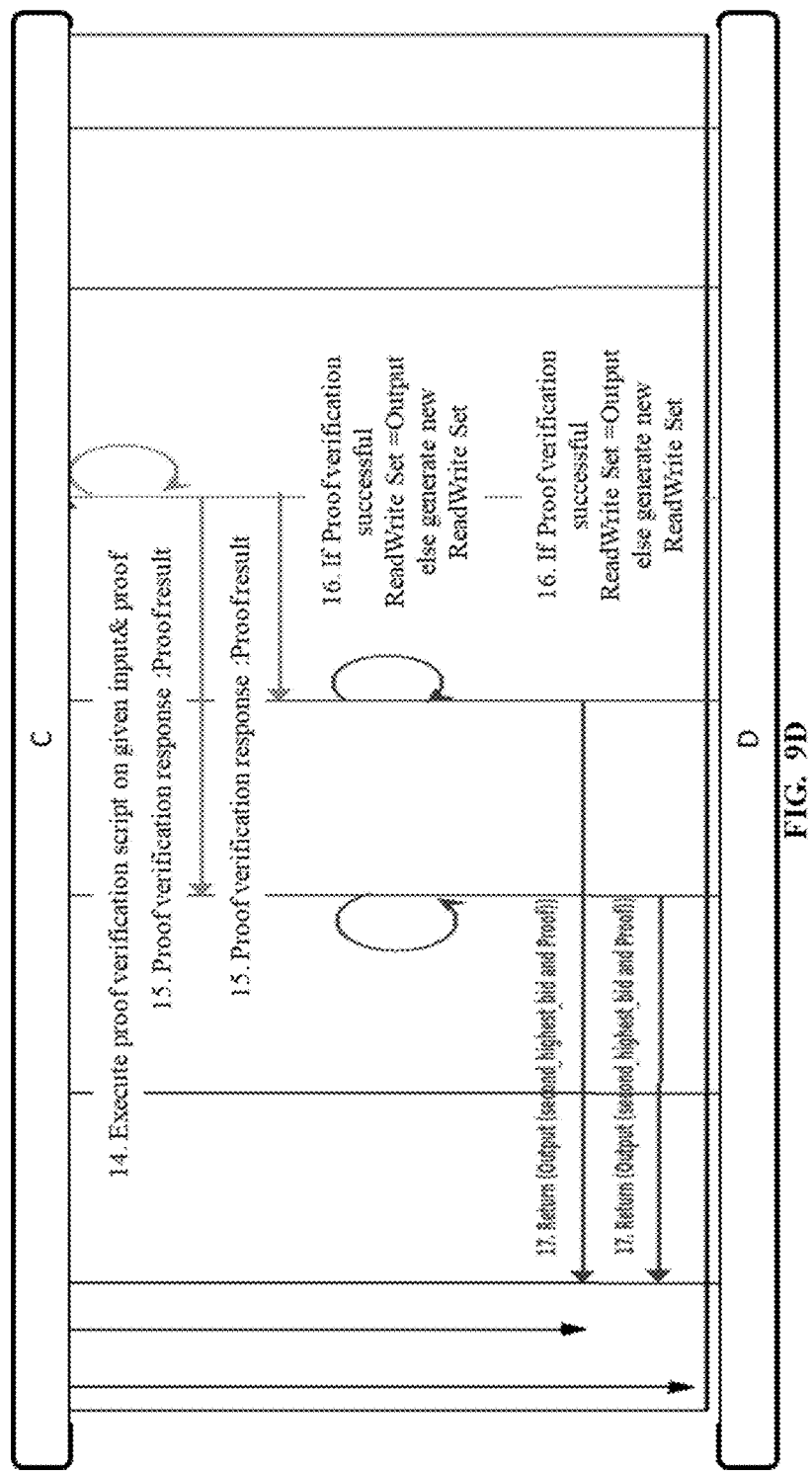
Figure 9E:
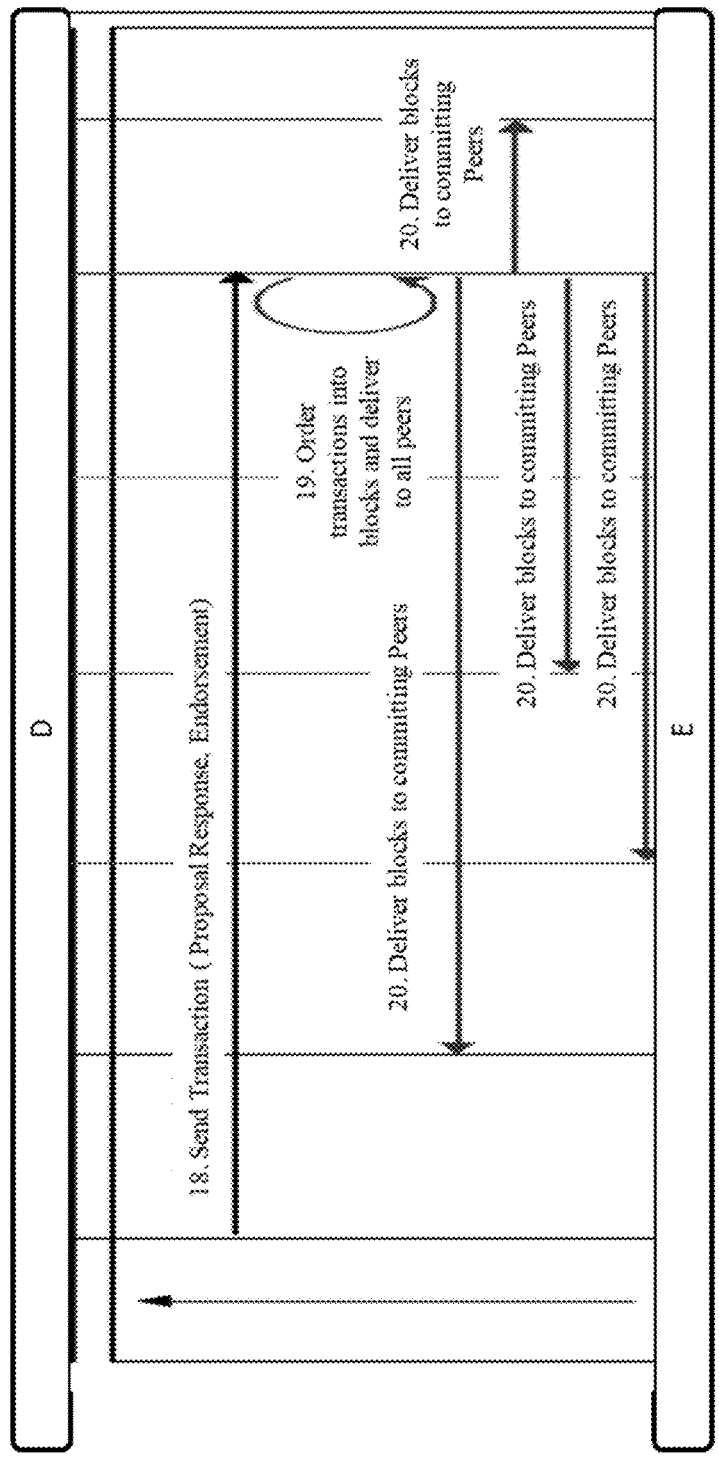
Figure 9F:
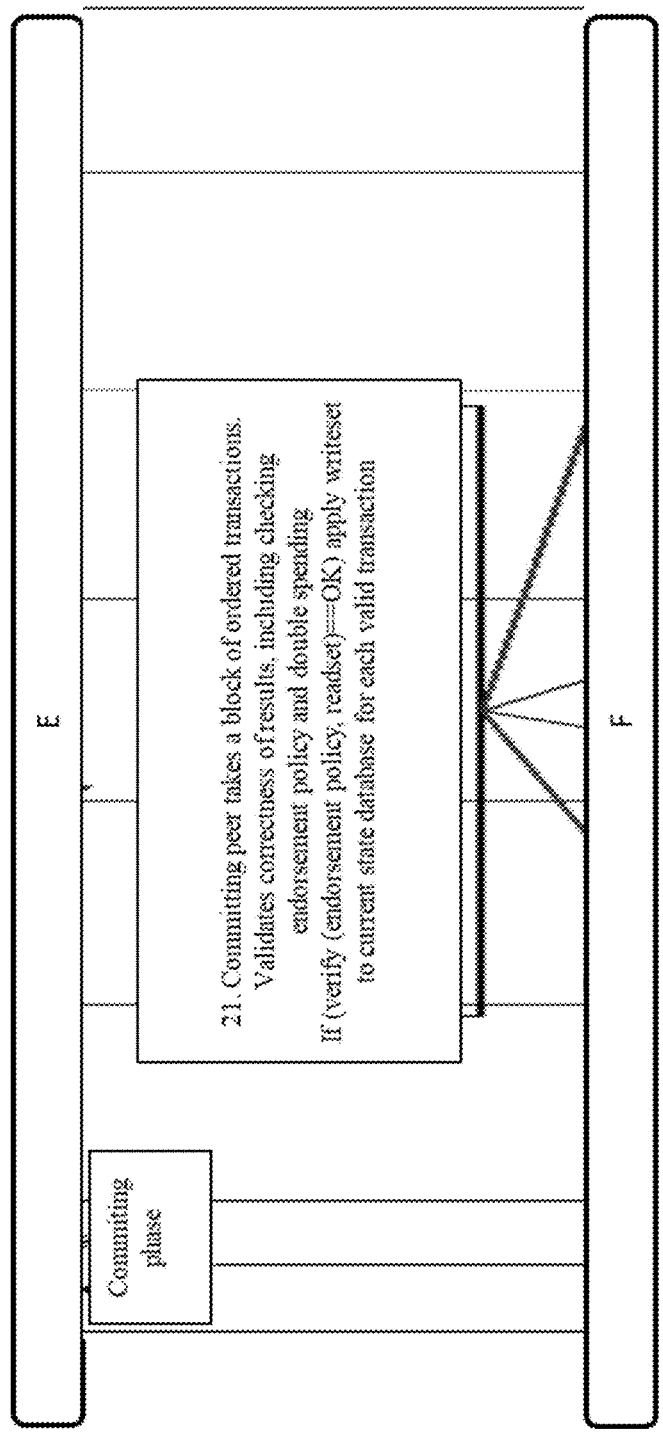
Figure 9G:
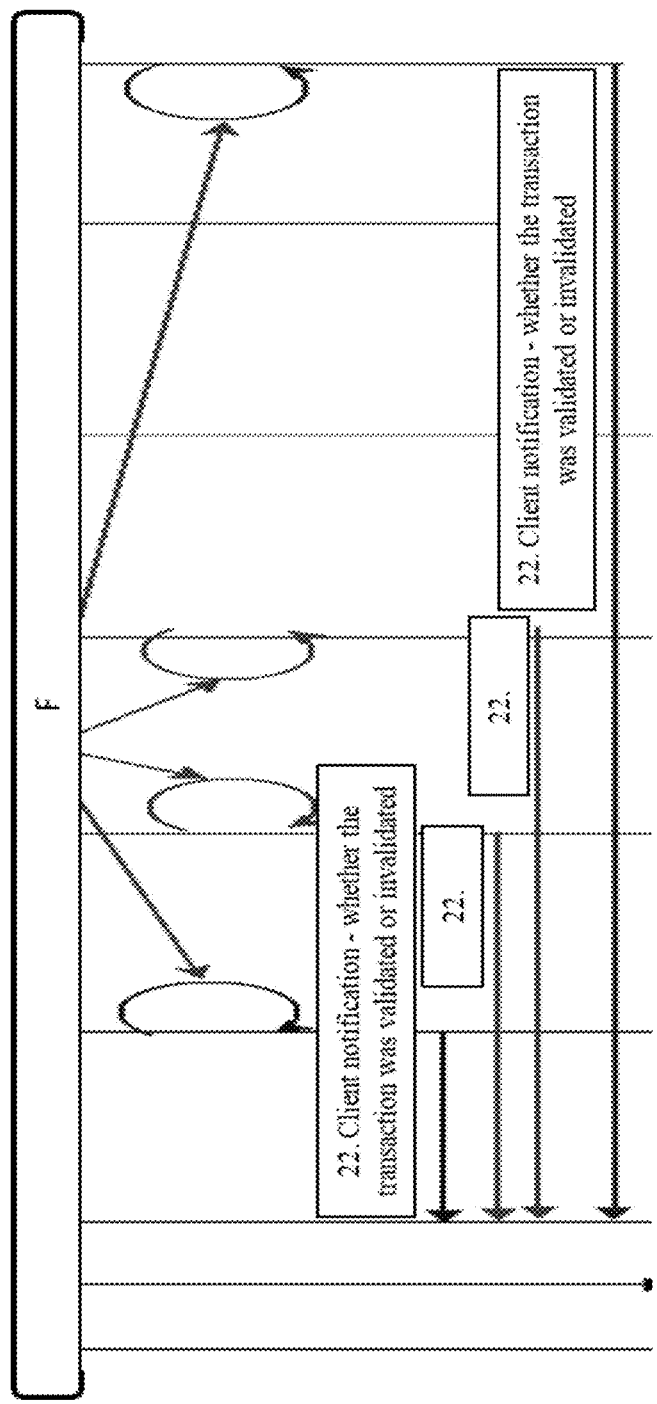
Figure 10A:
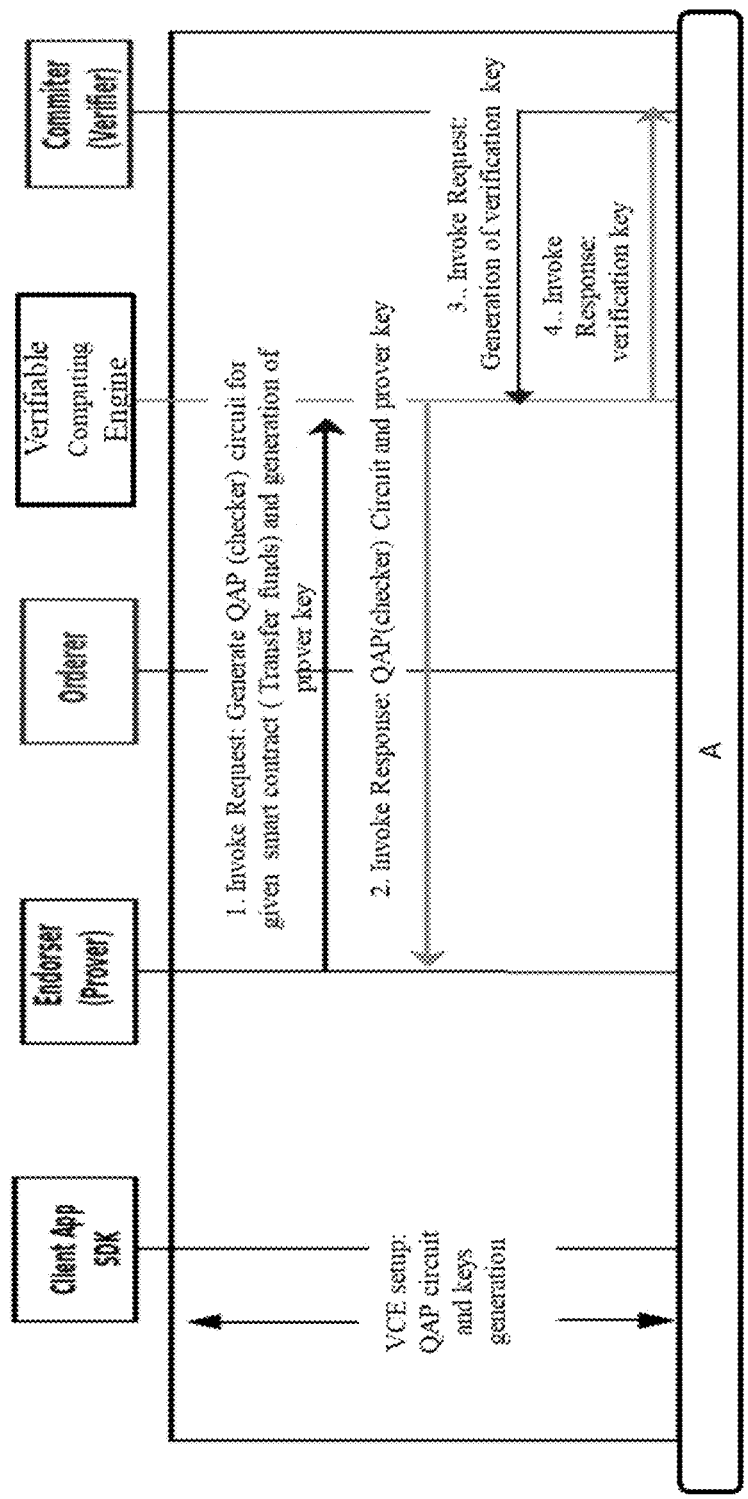
FIGS. 10A through 10E illustrates the bidding use case interaction diagram for bidding use case in the committer-verify model of the veriblock, in accordance with some embodiments of the present disclosure.
Figure 10B:
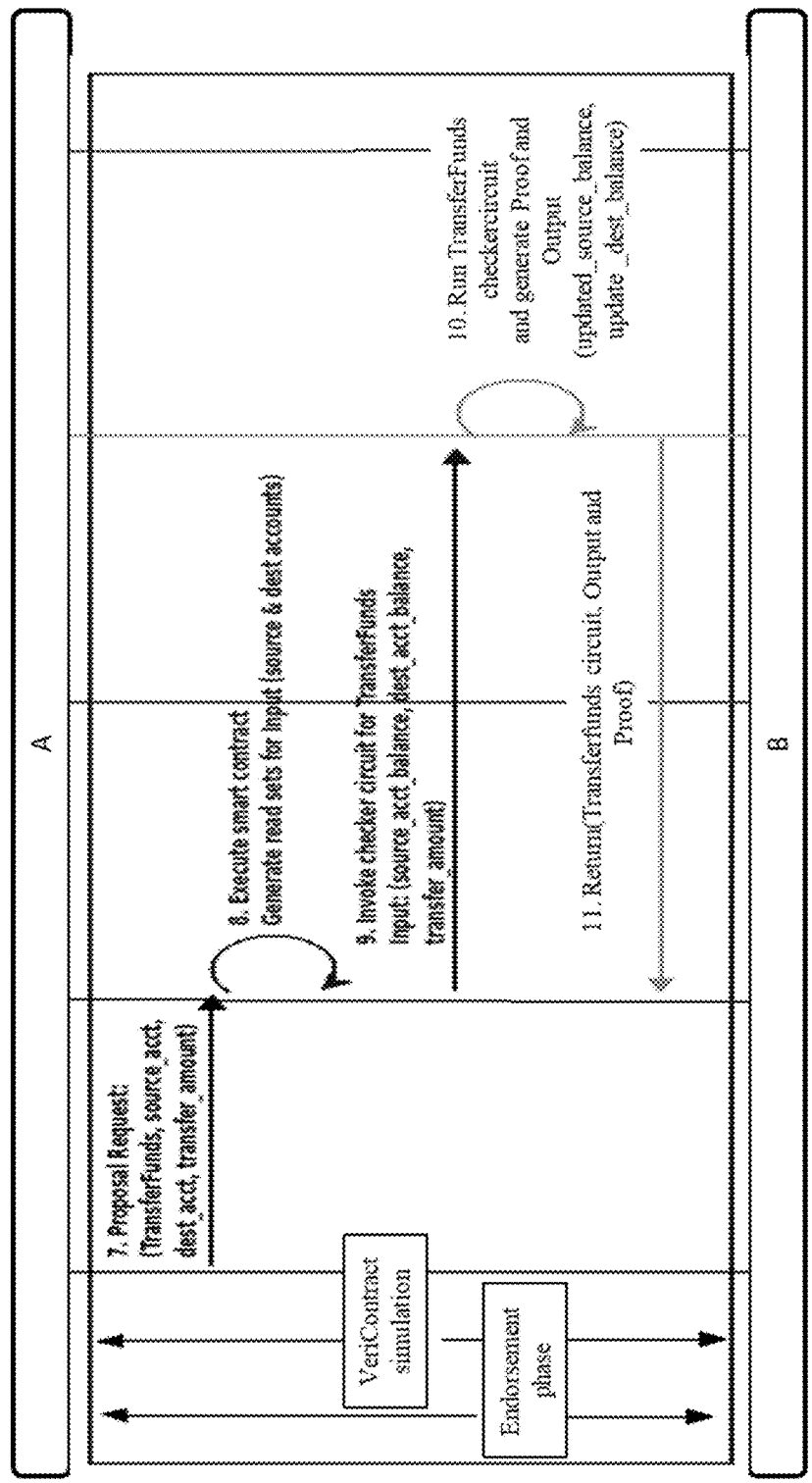
Figure 10C:
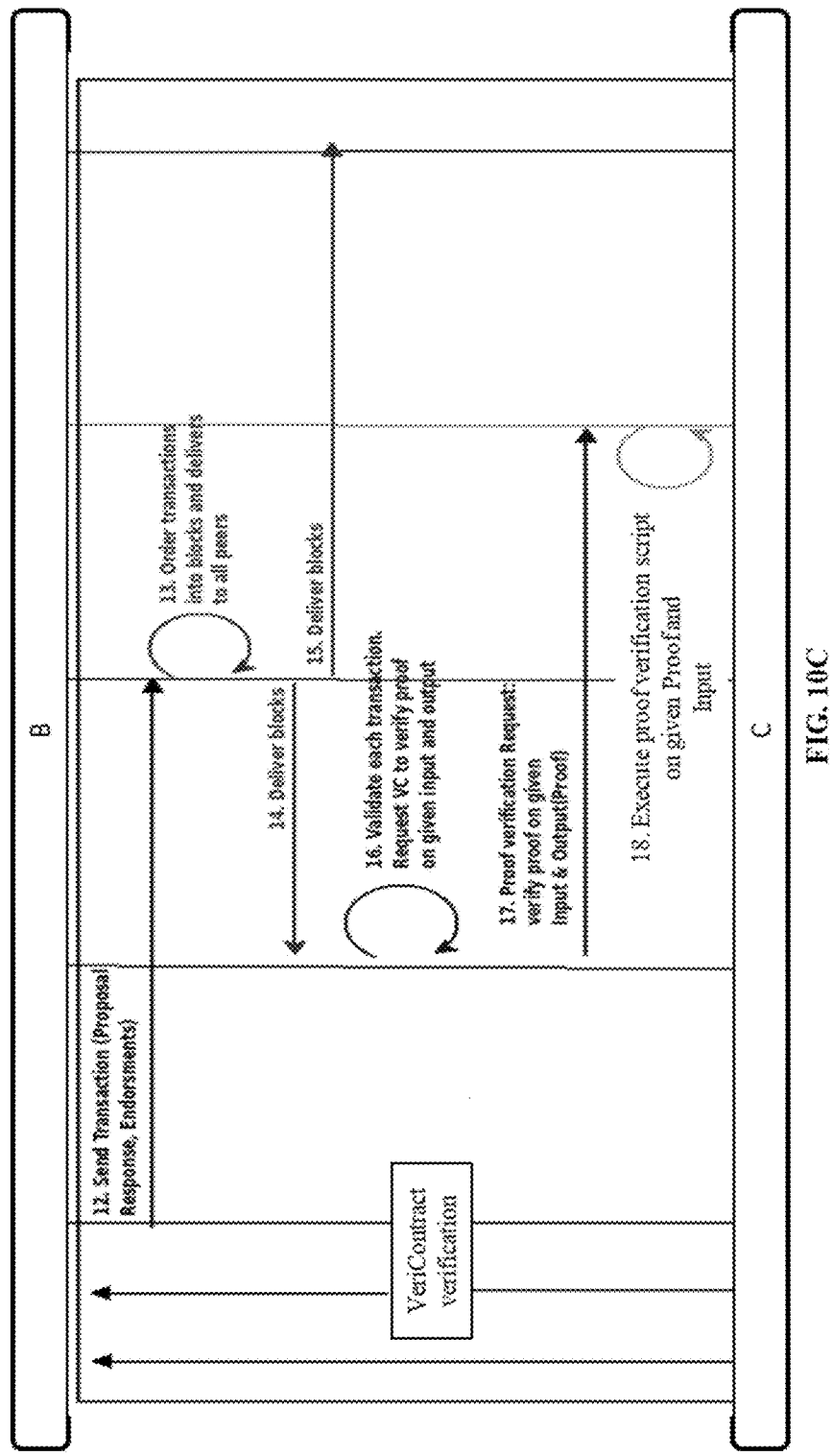
Figure 10D:
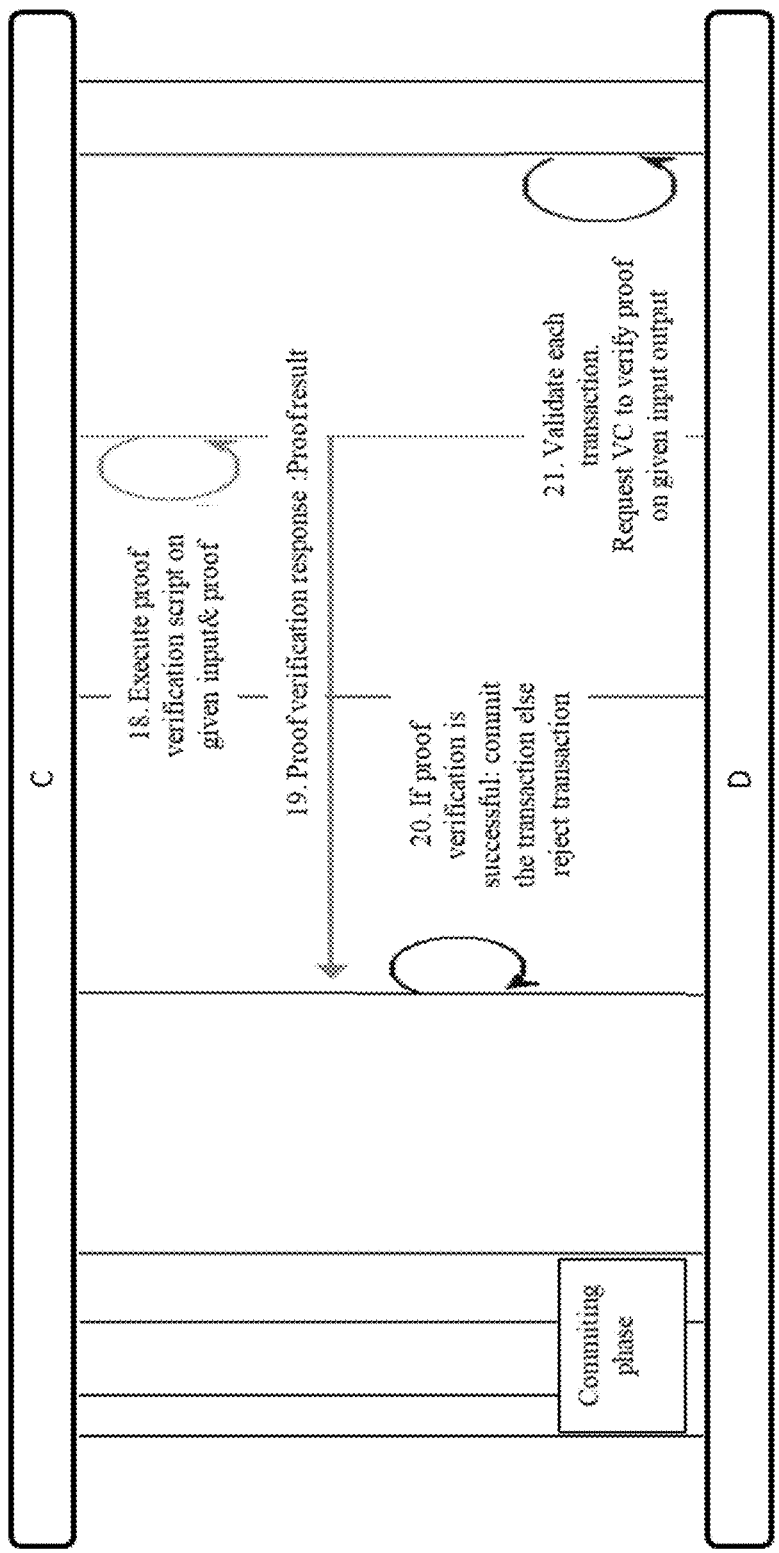
Figure 10E:
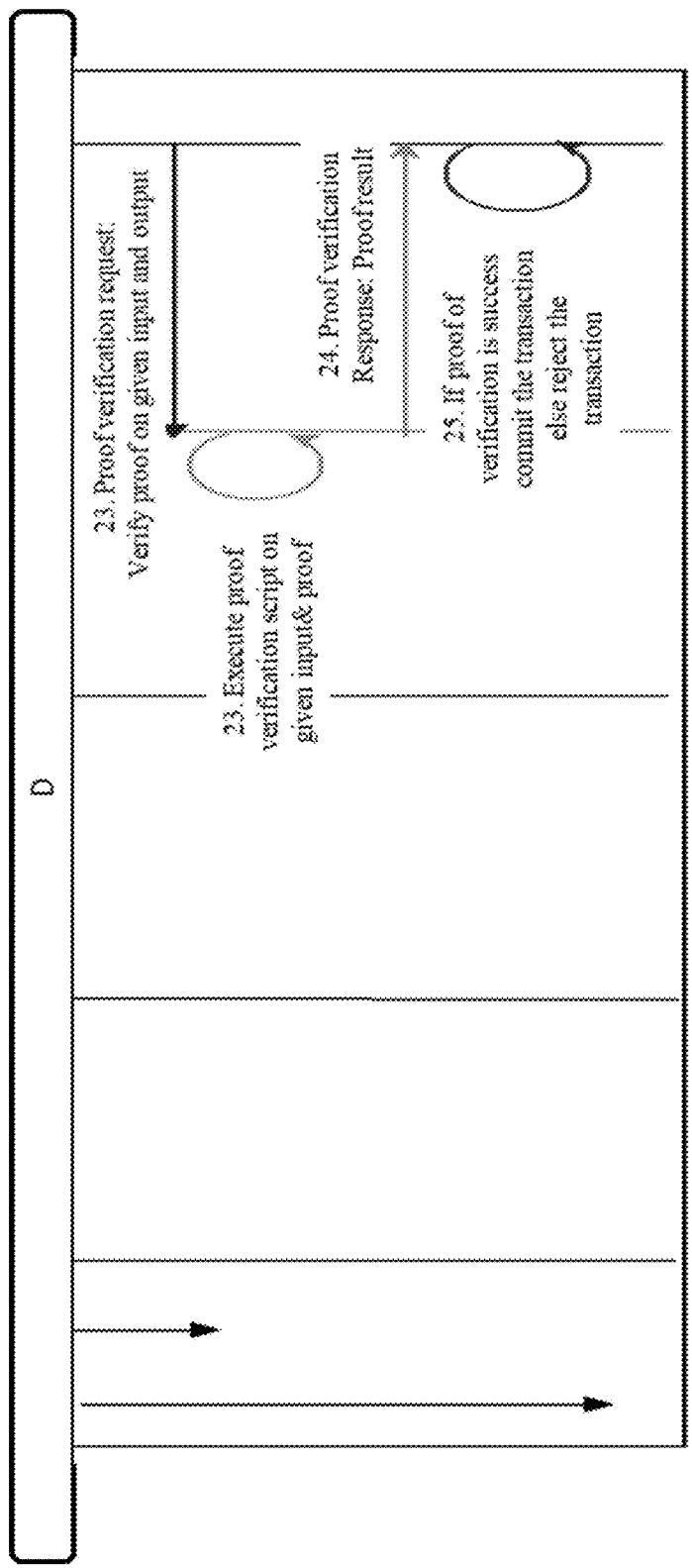

FIG. 8A and FIG. 8B illustrates a sequence diagram for the Bidding use case in Intel SGX Implementation in endorser-verify Model, in accordance with some embodiments of the present disclosure.

Bidding Algorithm: In this use-case, there are few clients who bid by committing on an encrypted bid value. The manager processes the bids and announce the second largest bid in the list as winner (refer the pseudo code above). There are three phases: Bidding, Keysharing and Open phase. In Bidding Phase, users generate a HMAC (Hash based Message Authentication Code) of the bid value and encrypt the bid using AES and submit to the manager. During the Key sharing phase, the AES keys are shared to the Manager. During the Open phase, the manager decrypts the bids validate the integrity of the bid value using the HMAC and announce the second largest element in the list. In our architecture the Manager is the Endorsing Peer running the Bidding smart contract. For the VC based approach, the VCE runs the Open phase given in the pseudo code and generate the proof along with the second highest value. Due to resource constraint of implementation, hashing step is not included, but not to be construed as limitation of the system 100. In case of Intel SGX based approach, the steps for Key Sharing phase and Open phase given in pseudo code is run in the enclave and the resulting second highest bid value is signed by the enclave generated keypair as depicted in FIG. 8A and FIG. 8B. Implementation and experimentation is performed by running the bidding use case in a naive manner (normal known process), Intel SGX and VC approaches.

The experiments are conducted by running bidding algorithm (only the winner selection step) with varying number of users (50, 100, 150, 200 and 250). The performance of the runtime (in secs) of the use case with above setups is plotted in FIG. 5 on a logarithmic scale. It can be inferred that run time for the naive version and the Intel SGX is almost same, but for VC based approach, running time is very high almost in the multiples of hundred. The reason is the technologic limitation of existing VC techniques, which is still in development phase. However, it can be understood by a person skilled in the art that with research and development in VC techniques the runtime for VC based approach disclosed herein also will be improved multifold to match the Intel SGX or the naïve approaches.

Figure 6:
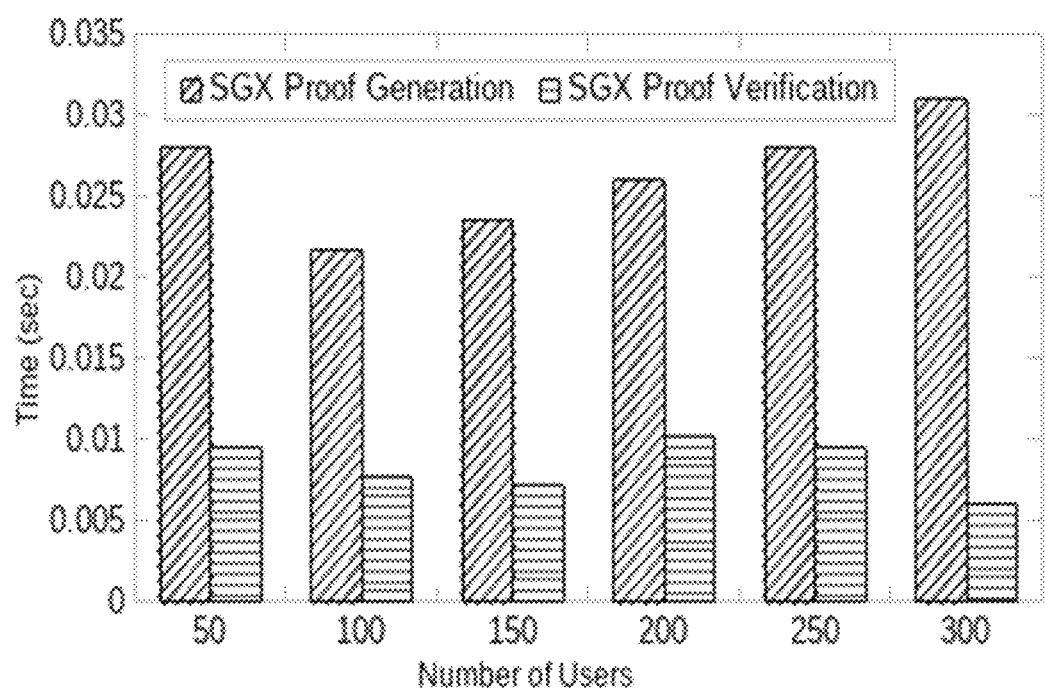
Figure 7:
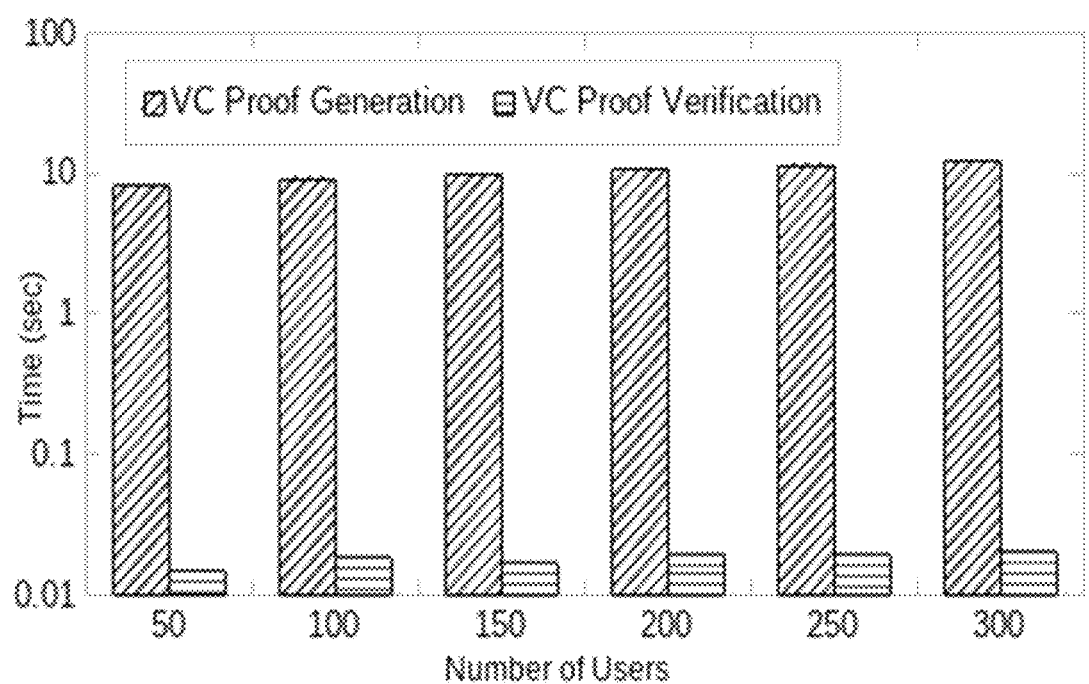

In FIG. 7, plotted is the performance time for proof generation versus of verification in VC based setup. Similarly, the graph in FIG. 6 depicts the Intel SGX case. In both the schemes the proof verification time is lesser than proof generation. Thus, it can be inferred that VeriBlock based on TEE approach has better performance when compared to VC approach. However, the verification time is less than proving time in both approaches. However, proving time in VC based approach is more than TEE based approach. However, the performance can be improved by using some VC techniques such as STARK. Though TEE based approach (SGX) has edge over VC with respect to performance, however, there are security concerns (recent Spectre and Meltdown attacks on SGX) and one of the main issue with the SGX is that there is no underlying mathematical guarantees on security. The advantage with VC is that, it provides strong mathematical guarantees for the security, but it is very slow. Hence, each approach has certain advantages and disadvantages, one needs careful analysis before deploying them for large scale commercial implementations.

Further, when both the approaches including the endorser-verify model and the committer-verify model disclosed herein are compared among themselves, the endorser-verify model may be preferred over the committer-verify model, because the latter requires more number of peers for proof verification. Hence, this is more suitable for order-execute-validate blockchain framework.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method for processing transactions in a blockchain network, the method comprising:

receiving, by one or more hardware processors via a client among plurality of clients in a blockchain network, a request for processing a transaction from an end user;

generating, by the one or more hardware processors via the client, a first set of transaction proposals for the transaction;

forwarding, by the one or more hardware processors via the client, the first set of transaction proposals to one or more proving peers, identified from among a plurality of endorsing peers in the blockchain network in accordance with an endorsement policy;

executing, by the one or more hardware processors via each of the one or more proving peers, a vericontract corresponding to the first set of transaction proposals, wherein the vericontract is a smart contract associated with a proof of correctness of execution of the smart contract by each of the one or more proving peers during an endorsement phase of a blockchain process, and wherein the vericontract is executed to generate an output and the proof using one of a) Verifiable Computing (VC) approach, b) a Trusted Execution Environment (TEE) approach, and c) a hybrid approach comprising combination of the VC approach and the TEE approach, wherein executing the vericontract by each of the one or more proving peers to generate the output of the smart contract computation and the proof of the computation using the hybrid approach comprises:

partitioning the smart contract into a plurality of modules using a scheduler, wherein the scheduler includes a scheduler component for maintaining information about the one or more proving peers and information on whether the VC approach or the TEE approach or the hybrid approach is supported, wherein the scheduler schedules high risk operations to the VC approach and low risk operations to the TEE approach, and wherein the scheduler schedules:

a) a first set of modules among the plurality of modules having dependency on each other to run in sequential manner, wherein each of the first set of modules are assigned a unique name and tagged with a sequence type as sequential, and b) a second set of modules among the plurality of modules that are independent to be run in parallel, wherein each of the second set of modules are assigned a unique name and tagged with the sequence type as parallel;

identifying a proof type for each of the first set of modules and the second set of modules based on a set of parameters associated with each of the plurality of modules, wherein c) modules, among the first set of modules and the second set of modules, satisfying a first parameter criteria are run using the VC approach, and d) modules, among the first set of modules and the second set of modules, satisfying a second parameter criteria are run using TEE approach;

generating the proof and storing the proof in a template, wherein the template comprising ModuleName: <Name>, ProofType:<VCE/TEE>, SequenceType: <Sequential/Parallel>, and Proof Data, wherein the scheduler generates and consolidates the proof from proofs generated using the VC approach and the TEE approach; and aggregating the proof from the first set of modules and the second set of modules generated using the VC approach and the TEE approach by concatenating, wherein the aggregated proof along with the output is sent as the verification data for verification to the set of verifying peers;

sending a first set of proposal responses to the client, wherein the first set of proposal responses are generated in terms of a set of verification data, by the one or more hardware processors via each of the one or more proving peers to the client, wherein each verification data among the set of verification data comprises the output accompanied with the proof generated during execution of the vericontract by each of the one or more proving peers; and processing, by the one or more hardware processors via the client, the first set of proposal responses for executing the transaction in the blockchain network based on one of a) a endorser-verify model and b) a committer-verify model, wherein processing the first set of transaction proposal responses in accordance with the endorser-verify model comprises:

creating and sharing by the client, a second set of transaction proposals to a set of verifying peers, wherein the second set of transaction proposals are generated for the received first set of proposal responses and comprises the set of verification data, and wherein the set of verifying peers are a set of endorsing verifiers identified among the plurality of endorsing peers in accordance with the endorsement policy for the endorser-verify model;

processing the second set of transaction proposals, by the set of endorsing verifiers to verify the executed vericontract based on the set of verification data received in the second set of transaction proposals during the endorsement phase, wherein the verification is performed in accordance with a) the VC approach, b) the TEE approach and c) the hybrid approach used during execution of the vericontract;
sending a second set of proposal responses generated by each of the set of endorsing verifiers, indicating endorsed transactions to the client in response to the processed second set of transaction proposals;
broadcasting by the client to an orderer the endorsed transactions;
ordering by the orderer, the endorsed transactions into a block and broadcasting the block to a plurality of committing peers of the blockchain network, wherein the plurality of committing peers comprise participating peers in the blockchain network; and
committing the transaction to the blockchain network by the plurality of committing peers after verifying the endorsed transactions and validating results of the endorsed transactions.

2. The method of claim 1, wherein verifying the executed vericontract by each of the set of verifying peers based on the set of verification data received in the second set of transaction proposals using the hybrid approach comprises:
parsing the verification data based on the ProofType and the SequenceType to be processed for proof verification in accordance to the VC approach or the TEE approach based on the proof type and the sequence type;
validating the proof using one of the VC approach or the TEE approach by each of the set of verifying peers in accordance with ProofType present in the verification data; and
declaring the executed vericontract as valid if the proof is validated by each of set of verifying peers.

3. The method of claim 1, wherein verifying the executed vericontract by the set of verifying peers based on the set of verification data received in the second set of transaction proposals, using the VC approach comprises executing the smart contract entirely using VC without partitioning the smart contract, wherein the VC approach is used if transactions requires high end security with low cost and high latency.

4. The method of claim 1, wherein verifying the executed vericontract by the set of verifying peers based on the set of verification data received in the second set of transaction proposals, using the TEE based approach comprises executing the smart contract entirely using TEE without partitioning the smart contract, wherein the TEE based approach is selected if transaction requires high cost with low latency and medium to low security.

5. The method of claim 1, wherein processing the first set of proposal responses, by the client, for executing the transaction in the blockchain network based on one the committer-verify model comprises:
identifying the first set of proposal responses as endorsed transactions, wherein first set of proposal responses comprises the set of verification data, wherein each verification data among the set of verification data comprises the output accompanied with the proof generated during execution of the vericontract by each of the one or more proving peers;
broadcasting, by the client to an orderer the endorsed transactions;
ordering, by the orderer, the endorsed transactions into the block and broadcasting the block to the plurality of committing peers of the blockchain network;
verifying, the executed vericontract by each of the set of verifying peers based on one of a) the VC approach, b) the TEE approach and c) the hybrid approach based on the set of verification data received in the first set of transaction proposals, wherein the set of verifying peers, for the commit-verify model are the plurality of committing peers; and
committing the transaction to the blockchain network by the set plurality of committing peers after verifying the endorsed transactions and validating results of the endorsed transactions.

6. The method of claim 1, wherein one or more proving peers are utilized to handle crash fault, and wherein the set of verifying peers verify the first received verification data to validate the transaction.

7. A system for processing transactions in a blockchain network, the system comprising:
a memory storing instructions;
one or more Input/Output (I/O) interfaces; and
one or more hardware processors coupled to the memory via the one or more I/O interfaces, wherein the one or more hardware processors are configured by the instructions to:
receive via a client among plurality of clients in a blockchain network, a request for processing a transaction from an end user;
generate via the client, a first set of transaction proposals for the transaction;
forward via the client, the first set of transaction proposals to one or more proving peers, identified among a plurality of endorsing peers in the blockchain network in accordance with an endorsement policy;
execute via each of the one or more proving peers, a vericontract corresponding to the first set of transaction proposals, wherein the vericontract is a smart contract associated with a proof of correctness of execution of the smart contract by each of the one or more proving peers during an endorsement phase of a blockchain process, and wherein the vericontract is executed to generate an output and the proof using one of a) Verifiable Computing (VC) approach, b) a Trusted Execution Environment (TEE) approach and c) a hybrid approach comprising combination of the VC approach and the TEE approach, wherein the one or more hardware processors are configured to execute the vericontract by each of the one or more proving peers to generate the output of the smart contract computation and the proof of the computation using the hybrid approach by:
partitioning the smart contract into a plurality of modules using a scheduler, wherein the scheduler includes a scheduler component for maintaining information about the one or more proving peers and information on whether the VC approach or the TEE approach or the hybrid approach is supported, wherein the scheduler schedules high risk operations to the VC approach and low risk operations to the TEE approach, and wherein the scheduler schedules:
a) a first set of modules among the plurality of modules having dependency on each other to run in sequential manner, wherein each of the first set of modules are assigned a unique name and tagged with a sequence type as sequential, and
b) a second set of modules among the plurality of modules that are independent to be run in parallel, wherein each of the second set of modules are assigned a unique name and tagged with the sequence type as parallel;

identifying a proof type for each of the first set of modules and the second set of modules based on a set of parameters associated with each of the plurality of modules, wherein
   c) modules, among the first set of modules and the second set of modules, satisfying a first parameter criteria are run using the VC approach, and
   d) modules, among the first set of modules and the second set of modules, satisfying a second parameter criteria are run using TEE approach;
generating the proof and storing the proof in a template, wherein the template comprising ModuleName: <Name>, ProofType:<VCE/TEE>, SequenceType: <Sequential/Parallel>, and Proof Data, wherein the scheduler generates and consolidates the proof from proofs generated using the VC approach and the TEE approach; and
aggregating the proof from the first set of modules and the second set of modules generated using the VC approach and the TEE approach by concatenating, wherein the aggregated proof along with the output is sent as the verification data for verification to the set of verifying peers;
sending a first set of proposal responses to the client, wherein the first set of proposal responses are generated in terms of a set of verification data, by the one or more hardware processors via each of the one or more proving peers to the client, wherein each verification data among the set of verification data comprises the output accompanied with the proof generated during execution of the vericontract by each of the one or more proving peers; and
process via the client, the first set of proposal responses for executing the transaction in the blockchain network based on one of a) an endorser-verify model and b) a committer-verify model, wherein the one or more hardware processors are configured to process the first set of transaction proposal responses in accordance with the endorser-verify model by:
   creating and sharing by the client, a second set of transaction proposals to a set of verifying peers, wherein the second set of transaction proposals are generated for the received first set of proposal responses and comprises the set of verification data, and wherein the set of verifying peers are a set of endorsing verifiers identified among the plurality of endorsing peers in accordance with the endorsement policy for the endorser-verify model;
   processing the second set of transaction proposals, by the set of endorsing verifiers to verify the executed vericontract based on the set of verification data received in the second set of transaction proposals during the endorsement phase, wherein the verification is performed in accordance with a) the VC approach, b) the TEE approach and c) the hybrid approach used during execution of the vericontract;
   sending a second set of proposal responses generated by each of the set of endorsing verifiers, indicating endorsed transactions to the client in response to the processed second set of transaction proposals;
   broadcasting by the client to an orderer the endorsed transactions;
   ordering by the orderer, the endorsed transactions into a block and broadcasting the block to a plurality of committing peers of the blockchain network, wherein the plurality of committing peers comprise participating peers in the blockchain network; and
   committing the transaction to the blockchain network by the plurality of committing peers after verifying the endorsed transactions and validating results of the endorsed transactions.

8. The system of claim 7, wherein the one or more hardware processors (104) are configured to verify the executed vericontract by each of the set of verifying peers based on the set of verification data received in the second set of transaction proposals using the hybrid approach by:
   parsing the verification data based on the ProofType and the SequenceType to be processed for proof verification in accordance to the VC approach or the TEE approach based on the proof type and the sequence type;
   validating the proof using one of the VC approach or the TEE approach by each of the set of verifying peers in accordance with ProofType present in the verification data; and
   declaring the executed vericontract as valid if the proof is validated by each of set of verifying peers.

9. The system of claim 7, wherein the one or more hardware processors are configured to verify the executed vericontract by the set of verifying peers based on the set of verification data received in the second set of transaction proposals, using the VC approach by executing the smart contract entirely using VC without partitioning the smart contract, wherein the VC approach is used if transactions requires high end security with low cost and high latency.

10. The system of claim 7, wherein the one or more hardware processors are configured to verify the executed vericontract by the set of verifying peers based on the set of verification data received in the second set of transaction proposals, using the TEE based approach by executing the smart contract entirely using TEE without partitioning the smart contract, wherein the TEE based approach is selected if transaction requires high cost with low latency and medium to low security.

11. The system of claim 7, wherein the one or more hardware processors are configured to process the first set of proposal responses, via the client, for executing the transaction in the blockchain network based on one the committer-verify model by:
   identifying the first set of proposal responses as endorsed transactions, wherein first set of proposal responses comprises the set of verification data, wherein each verification data among the set of verification data comprises the output accompanied with the proof generated during execution of the vericontract by each of the one or more proving peers;
   broadcasting, by the client to an orderer the endorsed transactions;
   ordering, by the orderer, the endorsed transactions into the block and broadcasting the block to the plurality of committing peers of the blockchain network;
   verifying, the executed vericontract by each of the set of verifying peers based on one of a) the VC approach, b) the TEE approach and c) the hybrid approach based on the set of verification data received in the first set of transaction proposals, wherein the set of verifying peers, for the commit-verify model are the plurality of committing peers; and
   committing the transaction to the blockchain network by the set plurality of committing peers after verifying the endorsed transactions and validating results of the endorsed transactions.

12. The system of claim 7, one or more proving peers are utilized to handle crash fault, and wherein the set of verifying peers verify the first received verification data to validate the transaction.

13. One or more non-transitory machine readable information storage mediums comprising one or more instructions, which when executed by one or more hardware processors causes a method for processing transactions in a blockchain network, the method comprising:
  receiving via a client among plurality of clients in a blockchain network, a request for processing a transaction from an end user;
  generating via the client, a first set of transaction proposals for the transaction;
  forwarding via the client, the first set of transaction proposals to one or more proving peers, identified from among a plurality of endorsing peers in the blockchain network in accordance with an endorsement policy;
  executing via each of the one or more proving peers, a vericontract corresponding to the first set of transaction proposals, wherein the vericontract is a smart contract associated with a proof of correctness of execution of the smart contract by each of the one or more proving peers during an endorsement phase of a blockchain process, and wherein the vericontract is executed to generate an output and the proof using one of a) Verifiable Computing (VC) approach, b) a Trusted Execution Environment (TEE) approach, and c) a hybrid approach comprising combination of the VC approach and the TEE approach, wherein executing the vericontract by each of the one or more proving peers to generate the output of the smart contract computation and the proof of the computation using the hybrid approach comprises:
  partitioning the smart contract into a plurality of modules using a scheduler, wherein the scheduler includes a scheduler component for maintaining information about the one or more proving peers and information on whether the VC approach or the TEE approach or the hybrid approach is supported, wherein the scheduler schedules high risk operations to the VC approach and low risk operations to the TEE approach, and wherein the scheduler schedules:
    a) a first set of modules among the plurality of modules having dependency on each other to run in sequential manner, wherein each of the first set of modules are assigned a unique name and tagged with a sequence type as sequential, and
    b) a second set of modules among the plurality of modules that are independent to be run in parallel, wherein each of the second set of modules are assigned a unique name and tagged with the sequence type as parallel;
  identifying a proof type for each of the first set of modules and the second set of modules based on a set of parameters associated with each of the plurality of modules, wherein
    c) modules, among the first set of modules and the second set of modules, satisfying a first parameter criteria are run using the VC approach, and
    d) modules, among the first set of modules and the second set of modules, satisfying a second parameter criteria are run using TEE approach;
  generating the proof and storing the proof in a template, wherein the template comprising ModuleName:<Name>, ProofType:<VCE/TEE>, SequenceType:<Sequential/Parallel>, and Proof Data, wherein the scheduler generates and consolidates the proof from proofs generated using the VC approach and the TEE approach; and
  aggregating the proof from the first set of modules and the second set of modules generated using the VC approach and the TEE approach by concatenating, wherein the aggregated proof along with the output is sent as the verification data for verification to the set of verifying peers;
  sending a first set of proposal responses to the client, wherein the first set of proposal responses are generated in terms of a set of verification data, by the one or more hardware processors via each of the one or more proving peers to the client, wherein each verification data among the set of verification data comprises the output accompanied with the proof generated during execution of the vericontract by each of the one or more proving peers; and
  processing via the client, the first set of proposal responses for executing the transaction in the blockchain network based on one of a) a endorser-verify model and b) a committer-verify model, wherein processing the first set of transaction proposal responses in accordance with the endorser-verify model comprises:
    creating and sharing by the client, a second set of transaction proposals to a set of verifying peers, wherein the second set of transaction proposals are generated for the received first set of proposal responses and comprises the set of verification data, and wherein the set of verifying peers are a set of endorsing verifiers identified among the plurality of endorsing peers in accordance with the endorsement policy for the endorser-verify model;
    processing the second set of transaction proposals, by the set of endorsing verifiers to verify the executed vericontract based on the set of verification data received in the second set of transaction proposals during the endorsement phase, wherein the verification is performed in accordance with a) the VC approach, b) the TEE approach and c) the hybrid approach used during execution of the vericontract;
    sending a second set of proposal responses generated by each of the set of endorsing verifiers, indicating endorsed transactions to the client in response to the processed second set of transaction proposals;
    broadcasting by the client to an orderer the endorsed transactions;
    ordering by the orderer, the endorsed transactions into a block and broadcasting the block to a plurality of committing peers of the blockchain network, wherein the plurality of committing peers comprise participating peers in the blockchain network; and
    committing the transaction to the blockchain network by the plurality of committing peers after verifying the endorsed transactions and validating results of the endorsed transactions.

* * * * *